(12) United States Patent
Wang et al.

(10) Patent No.: US 9,621,919 B2
(45) Date of Patent: Apr. 11, 2017

(54) MULTI-LAYER VIDEO FILE FORMAT DESIGNS

(71) Applicant: QUALCOMM Incorporated, San Diego, CA (US)

(72) Inventors: Ye-Kui Wang, San Diego, CA (US); Ying Chen, San Diego, CA (US); Adarsh Krishnan Ramasubramonian, San Diego, CA (US); Fnu Hendry, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 14/521,042

(22) Filed: Oct. 22, 2014

(65) Prior Publication Data

US 2015/0110203 A1 Apr. 23, 2015

Related U.S. Application Data

(60) Provisional application No. 61/894,886, filed on Oct. 23, 2013.

(51) Int. Cl.
*H04N 19/597* (2014.01)
*H04N 19/136* (2014.01)
(Continued)

(52) U.S. Cl.
CPC ............. *H04N 19/597* (2014.11); *H04N 5/91* (2013.01); *H04N 19/136* (2014.11);
(Continued)

(58) Field of Classification Search
CPC .... H04N 19/597; H04N 19/136; H04N 19/30; H04N 19/46; H04N 19/573; H04N 19/59
(Continued)

(56) References Cited

U.S. PATENT DOCUMENTS

| 2007/0016594 A1* | 1/2007 | Visharam ........... G11B 27/3027 |
| 2010/0153395 A1* | 6/2010 | Hannuksela ......... G11B 27/102 707/737 |

(Continued)

OTHER PUBLICATIONS

Wiegand et al., "WD1: Working Draft 1 of High-Efficiency Video Coding", JCTVC-C403, 3rd Meeting: Guangzhou, CN:, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — William C Vaughn, Jr.
*Assistant Examiner* — Jae N Noh
(74) *Attorney, Agent, or Firm* — Shumaker & Sieffert, P.A.

(57) ABSTRACT

A computing device generates a file that comprises a track box that contains metadata for a track in the file. Media data for the track comprises a sequence of samples, each of the samples being a video access unit of multi-layer video data. As part of generating the file, the computing device generates, in the file, a sub-sample information box that contains flags that specify a type of sub-sample information given in the sub-sample information box. When the flags have a particular value, a sub-sample corresponding to the sub-sample information box contains exactly one coded picture and zero or more non-Video Coding Layer (VCL) Network Abstraction Layer (NAL) units associated with the coded picture.

36 Claims, 12 Drawing Sheets

(51) Int. Cl.
| | |
|---|---|
| H04N 19/30 | (2014.01) |
| H04N 19/46 | (2014.01) |
| H04N 5/91 | (2006.01) |
| H04N 19/70 | (2014.01) |
| H04N 19/573 | (2014.01) |
| H04N 19/58 | (2014.01) |
| H04N 19/59 | (2014.01) |
| H04N 21/845 | (2011.01) |
| H04N 21/854 | (2011.01) |
| H04N 19/52 | (2014.01) |
| H04N 19/91 | (2014.01) |

(52) U.S. Cl.
CPC ............. *H04N 19/30* (2014.11); *H04N 19/46* (2014.11); *H04N 19/573* (2014.11); *H04N 19/58* (2014.11); *H04N 19/59* (2014.11); *H04N 19/70* (2014.11); *H04N 21/8453* (2013.01); *H04N 21/85406* (2013.01); *H04N 19/52* (2014.11); *H04N 19/91* (2014.11)

(58) Field of Classification Search
USPC .................................................... 375/240.26
See application file for complete search history.

(56) References Cited

U.S. PATENT DOCUMENTS

| | | | |
|---|---|---|---|
| 2014/0161181 | A1 | 6/2014 | Samuelsson et al. |
| 2015/0078456 | A1* | 3/2015 | Hannuksela ........... H04N 19/70 375/240.25 |
| 2015/0103921 | A1 | 4/2015 | Hannuksela |
| 2015/0110192 | A1 | 4/2015 | Wang et al. |
| 2015/0110203 | A1 | 4/2015 | Wang et al. |
| 2015/0110473 | A1 | 4/2015 | Wang et al. |
| 2016/0044309 | A1 | 2/2016 | Choi et al. |
| 2016/0234516 | A1* | 8/2016 | Hendry ................ H04N 19/187 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.
Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen et al., "High Efficiency Video Coding (HEVC) Scalable Extension Draft 3", Jul. 25-Aug. 2, 2013, Joint Collaborative Team on Video Coding (JCT-VC) of ITU-T SG 16 WP 3 and ISO/IEC JTC 1/SC 29/WG 11, Doc. JCTVC-N1008_v3, Sep. 16, 2013; 14th Meeting, Vienna, AT, 68 pp.
Choi, et al., "MV-HEVC/SHVC HLS: Random access of multiple layers", JCT-VC Meeting; Jul. 25-Aug. 2, 2013, Vienna, (Joint Collaborative Team on Video Coding of ISO/IEC JTC1/SC29/WG11 and ITU-T SG.16 ), URL : HTTP://WFTP3.ITU.INT/AV-ARCH/JCTVC-SITE/,, No. JCTVC-N0121-v4, Jul. 23, 2013, XP030114579, 4 pp.
Flynn, et al., "High Efficiency Video Coding (HEVC) Range Extensions Text Specification: Draft 4", Apr. 18-26, 2013Joint Collaborative Team on Video Coding (JCT-VC) of ITU-T SG 16 WP 3 and ISO/IEC JTC 1/SC 29/WG 11, Doc. JCTVC-N1005_v3, 13th Meeting: Incheon, KR, Aug. 8, 2013, 332 pp.
Hannuksela, "MV-HEVC/SHVC HLS: On non-HEVC base layer", JCT-VC Meeting; Oct. 23-Nov. 1, 2013; Geneva; (Joint Collaborative Team on Video Coding of ISO/IEC JTC1/SC29/WG11 and ITU-T SG.16 ); URL: HTTP://WFTP3.1TU.INT/AV-ARCH/JCTVC-SITE/, No. JCTVC-O0166, Oct. 15, 2013, 3 pp. XP030115192.
International Standard ISO/IEC 14496-12, Information Technology—Coding of audio-visual objects—Part 12: ISO base media file format, Third Edition, Oct. 15, 2008, 120 pp.
ISO/IEC: "Information technology—Coding of audio-visual objects—Part 15: Carriage of NAL unit structured video in the ISO Base Media File Format", ISO/IEC 14496-15:2013(E), vol. 2013, No. ISO/IEC 14496-15:2013(E) m31213, Oct. 24, 2013, XP030059666, 134 pp.
"Part 15: Carriage of network abstraction layer (NAL) unit structured video in ISO base media file format," Information Technology—Coding of audio visual objects, ISO/IEC 14496-15, Jul. 1, 2014, 124 pp.
Tech, et al., "MV-HEVC Draft Text 5", Jul. 27.-Aug. 2, 2013; Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Aug. 7, 2013, 65 pp.
Tech, et al.,"3D-HEVC Draft Text 1", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16); URL: HTTP://PHENIX.INT-EVRY.FR/JCT2/, No. JCT3V-E1001-v3, Sep. 11, 2013, XP030131378, 89 pp.

(56) References Cited

OTHER PUBLICATIONS

"Test Model1 of Video Coding for Browsers", MPEG Meeting; Jul. 29-Aug. 2, 2013; Vienna; (Motion Picture Expert Group or ISO/IEC JTC1/SC29/WG11), No. N13777, Aug. 31, 2013, 41 pp. XP030020525.
"Text of ISO/IEC 14496-15:2013 PDAM 1 Carriage of Layered HEVC", MPEG Meeting; Jul. 7-11, 2014; Sapporo; (Motion Picture Expert Group or ISO/IEC JTC1/SC29/WG11), No. N14727, Aug. 14, 2014, 34 pp., XP030021463.
"Text of ISO/IEC FDIS 14496-15:2010 3rd edition Carriage of NAL unit structured video in the ISO BMFF", 104, MPEG Meeting; Apr. 22-26, 2013; Incheon; (Motion Picture Expert Group or ISO/IEC JTC1/SC29/WG11), No. N13478, Jun. 8, 2013, 118 pp., XP030020228.
Vadakital, et al., "File format extensions for multi-layered HEVC coded sequences", MPEG Meeting; Oct. 28-Nov. 1, 2013; Geneva; (Motion Picture Expert Group or ISO/IEC JTC1/SC29/WG11), No. m31378, Oct. 23, 2013, XP030059831, 10 pp.
Wang, et al., "High Efficiency Video Coding (HEVC) Defect Report", Jul. 25-Aug. 2, 2013, Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Sep. 27, 2013 , 311 pp.

International Search Report and Written Opinion from International Application No. PCT/US2014/061941, dated Jan. 29, 2015, 11 pp.
Response to Written Opinion dated Jan. 29, 2015, from International Application No. PCT/US2014/061941, filed on Apr. 1, 2015, 5 pp.
Second Written Opinion from International Application No. PCT/US2014/061941, dated May 12, 2015, 7 pp.
Response to Second Written Opinion dated May 12, 2015, from International Application No. PCT/US2014/061941, filed on Jul. 8, 2015, 5 pp.
International Preliminary Report on Patentability from International Application No. PCT/US2014/061941, dated Jul. 28, 2015, 10 pp.
"Information technology—Coding of audio-visual objects—Part 14: MP4 file format," International Standard, ISO/IEC 14496-14, First edition Nov. 15, 2003, 18 pp.
Wang, et al., "File format for HEVC multi-layer extensions," ISO/IEC JTC1/SC29/WG11 MPEG2013/M31213, Oct. 28-Nov. 1, 2013, 139 pp.
Digital cellular telecommunications system (Phase 2+); Universal Mobile Telecommunications System (UMTS); LTE; Transparent end-to-end packet switched streaming service (PSS); 3GPP file format (3GP) (3GPP TS 26.244 version 11.1. Release 11), Oct. 2012, 62 pp.

* cited by examiner

MULTI-LAYER VIDEO FILE FORMAT DESIGNS

This application claims the benefit of U.S. Provisional Patent Application No. 61/894,886, filed Oct. 23, 2013, the entire content of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure relates to storing of video content in a file based on International Standards Organization (ISO) base media file format (ISOBMFF). Some examples of this disclosure relate to methods for storing of video streams containing multiple coded layers, where each layer may be a scalable layer, a texture view, a depth view, etc., and the methods may apply to storage of Multi-View High Efficiency Video Coding (MV-HEVC), Scalable HEVC (SHVC), 3-dimensional HEVC (3D-HEVC), and other types of video data.

In one aspect, this disclosure describes a method of processing multi-layer video data, the method comprising: generating a file that comprises a track box that contains metadata for a track in the file, wherein: media data for the track comprises a sequence of samples, each of the samples being a video access unit of the multi-layer video data; generating the file comprises generating, in the file, a sub-sample information box that contains flags that specify a type of sub-sample information given in the sub-sample information box, and when the flags have a particular value, a sub-sample corresponding to the sub-sample information box contains exactly one coded picture and zero or more non-Video Coding Layer (VCL) Network Abstraction Layer (NAL) units associated with the coded picture.

In another aspect, this disclosure describes a method of processing multi-layer video data, the method comprising: obtaining, from a file, a track box that contains metadata for a track in the file, wherein media data for the track comprises a sequence of samples, each of the samples being a video access unit of the multi-layer video data; and obtaining, from the file, a sub-sample information box that contains flags that specify a type of sub-sample information given in the sub-sample information box, wherein when the flags have a particular value, a sub-sample corresponding to the sub-sample information box contains exactly one coded picture and zero or more non-VCL NAL units associated with the coded picture.

In another aspect, this disclosure describes a video device comprising: a data storage medium configured to store multi-layer video data; and one or more processors configured to: generate a file that comprises a track box that contains metadata for a track in the file, wherein: media data for the track comprises a sequence of samples, each of the samples being a video access unit of the multi-layer video data; to generate the file, the one or more processors generate, in the file, a sub-sample information box that contains flags that specify a type of sub-sample information given in the sub-sample information box, and when the flags have a particular value, a sub-sample corresponding to the sub-sample information box contains exactly one coded picture and zero or more non-VCL NAL units associated with the coded picture.

In another aspect, this disclosure describes a video device comprising: a data storage medium configured to store multi-layer video data; and one or more processors configured to: obtain, from a file, a track box that contains metadata for a track in the file, wherein media data for the track comprises a sequence of samples, each of the samples being a video access unit of the multi-layer video data; and obtain, from the file, a sub-sample information box that contains flags that specify a type of sub-sample information given in the sub-sample information box, wherein when the flags have a particular value, a sub-sample corresponding to the sub-sample information box contains exactly one coded picture and zero or more non-VCL NAL units associated with the coded picture.

In another aspect, this disclosure describes a video device comprising: means for generating a file that comprises a track box that contains metadata for a track in the file, wherein: media data for the track comprises a sequence of samples, each of the samples being a video access unit of multi-layer video data; generating the file comprises generating, in the file, a sub-sample information box that contains flags that specify a type of sub-sample information given in the sub-sample information box, and when the flags have a particular value, a sub-sample corresponding to the sub-sample information box contains exactly one coded picture and zero or more non-VCL NAL units associated with the coded picture.

In another aspect, this disclosure describes a video device comprising: means for obtaining, from a file, a track box that contains metadata for a track in the file, wherein media data for the track comprises a sequence of samples, each of the samples being a video access unit of multi-layer video data; and means for obtaining, from the file, a sub-sample information box that contains flags that specify a type of sub-sample information given in the sub-sample information box, wherein when the flags have a particular value, a sub-sample corresponding to the sub-sample information box contains exactly one coded picture and zero or more non-VCL NAL units associated with the coded picture.

In another aspect, this disclosure describes a computer readable data storage medium having instructions stored thereon that when executed cause one or more processors to: generate a file that comprises a track box that contains metadata for a track in the file, wherein: media data for the track comprises a sequence of samples, each of the samples being a video access unit of multi-layer video data; to generate the file, the instructions cause the one or more processors to generate, in the file, a sub-sample information box that contains flags that specify a type of sub-sample information given in the sub-sample information box, and when the flags have a particular value, a sub-sample corresponding to the sub-sample information box contains exactly one coded picture and zero or more non-VCL NAL units associated with the coded picture.

In another aspect, this disclosure describes a computer readable data storage medium having instructions stored thereon that when executed cause one or more processors to: obtain, from a file, a track box that contains metadata for a track in the file, wherein media data for the track comprises a sequence of samples, each of the samples being a video access unit of multi-layer video data; and obtain, from the file, a sub-sample information box that contains flags that specify a type of sub-sample information given in the sub-sample information box, wherein when the flags have a particular value, a sub-sample corresponding to the sub-sample information box contains exactly one coded picture and zero or more non-VCL NAL units associated with the coded picture.

The details of one or more examples of the disclosure are set forth in the accompanying drawings and the description below. Other features, objects, and advantages will be apparent from the description, drawings, and claims.

DETAILED DESCRIPTION

Figure 1:
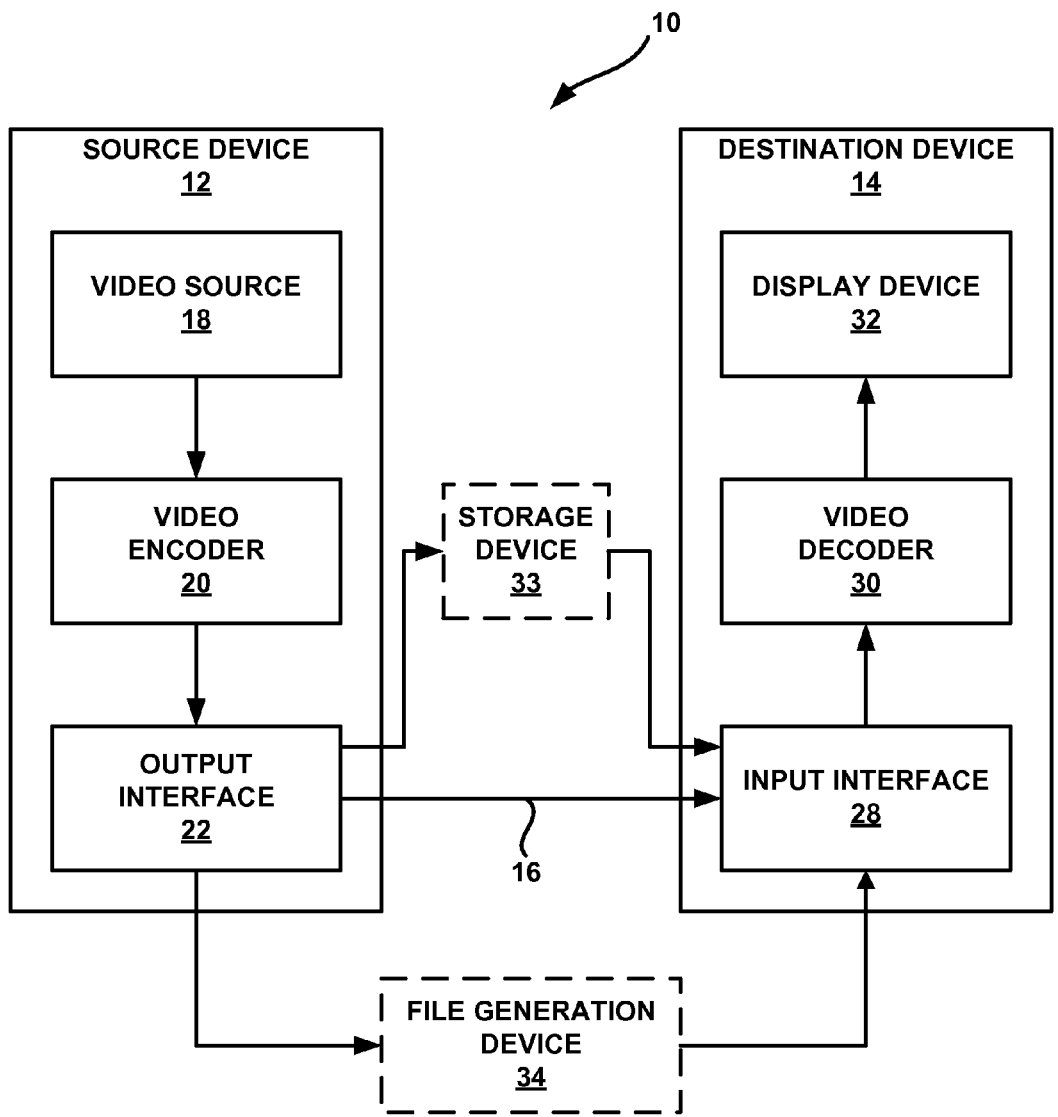
FIG. 1 is a block diagram illustrating an example video encoding and decoding system that may use the techniques described in this disclosure.

The ISO base media file format (ISOBMFF) is a file format for storing media data. The ISOBMFF is extendable to support the storage of video data conforming to particular video coding standards. For example, the ISOBMFF has previously been extended to support the storage of video data conforming to the H.264/AVC and High Efficiency Video Coding (HEVC) video coding standards. Furthermore, the ISOBMFF has previously been extended to support the storage of video data conforming to the multi-view coding (MVC) and scalable video coding (SVC) extensions of H.264/AVC. MV-HEVC, 3D-HEVC, and SHVC are extensions of the HEVC video coding standard that support multi-layer video data. The features added to the ISOBMFF for storage of video data conforming to the MVC and SVC extensions of H.264/AVC are not sufficient for effective storage of video data conforming to MV-HEVC, 3D-HEVC, and SHVC. In other words, various problems may arise if one were to attempt to use the extension of the ISOBMFF for storage of video data conforming to the MVC and SVC extensions of H.264/AVC for storage of video data conforming to MV-HEVC, 3D-HEVC, and SHVC.

For example, unlike a bitstream that conforms to the MVC or SVC extensions of H.264/AVC, a bitstream that conforms to MV-HEVC, 3D-HEVC, or SHVC may include access units that contain Intra Random Access Point (IRAP) pictures and non-IRAP pictures. An access unit containing IRAP pictures and non-IRAP pictures may be used for random access in MV-HEVC, 3D-HEVC, and SHVC. However, the ISOBMFF and existing extensions thereof do not provide a way of identifying such access units. This may hinder the ability of a computing device to perform random access and layer switching.

Hence, in accordance with one example of this disclosure, a computing device may generate a file that comprises a track box that contains metadata for a track in the file. Media data for the track comprises a sequence of samples. Each of the samples may be a video access unit of multi-layer video data (e.g., MV-HEVC, 3D-HEVC, or SHVC video data). As part of generating the file, the computing device may generate, in the file, an additional box that documents all of the samples containing at least one IRAP picture. Being able to determine samples containing IRAP pictures based on information in the additional box may enable computing devices receiving the file to perform random access and layer switching without parsing and interpreting NAL units. This may reduce complexity and processing times.

Furthermore, multi-layer video data, such as MV-HEVC, 3D-HEVC, and SHVC video data, may include multiple coded pictures for each access unit. However, the ISOBMFF and existing extensions thereof do not provide information regarding individual coded pictures within an access unit when there are multiple encoded pictures in the access unit. Thus, in examples where a computing device (e.g., a streaming server) is determining whether to forward NAL units in a file, the computing device may need to parse and interpret information stored in the NAL units in order to determine whether to forward the NAL units. Parsing and interpreting information stored in the NAL units may increase the complexity of the computing device and may increase streaming delay.

Hence, in accordance with one example of this disclosure, a computing device may generate a file that comprises a track box that contains metadata for a track in the file. Media data for the track comprises a sequence of samples. Each of the samples is a video access unit of the multi-layer video data. As part of generating the file, the computing device generates, in the file, a sub-sample information box that contains flags that specify a type of sub-sample information given in the sub-sample information box. When the flags have a particular value, a sub-sample corresponding to the sub-sample information box contains exactly one coded picture and zero or more non-Video Coding Layer (VCL) NAL units associated with the coded picture. In this way, computing devices that receive the file may be able to use the sub-sample information given in the sub-sample information box to make determinations regarding individual coded pictures within a sample of the file. Non-VCL NAL units associated with the coded picture may include NAL units for parameter sets (e.g., PPS, SPS, VPS) and SEI applicable to the coded picture.

In multi-layer video data, an access unit may include coded pictures that are marked as being for output and coded pictures that are marked as not being for output. A video decoder may use coded pictures that are marked as not being for output as reference pictures for decoding pictures that are marked as being for output. A NAL unit header for a NAL unit of a slice of a picture may include a picture output flag (e.g., pic_output_flag in HEVC) that indicates whether the picture is marked as being for output. In an ISOBMFF file, each sample is required to be associated with an output time (e.g., a composition time) that indicates when a sample is to be output. However, pictures that are marked as not being for output do not have output times. Thus, the presence of pictures that are marked as not being for output may violate this requirement of the ISOBMFF or may require non-standard work-around techniques.

Hence, in accordance with one or more techniques of this disclosure, a computing device may generate a file that comprises a media data box that encloses media content. The media content comprises a sequence of samples. Each of the samples comprises an access unit of the multi-layer video data. As part of generating the file, the computing device may, responsive to a determination that at least one access unit of a bitstream of the multi-layer video data includes a coded picture that has a picture output flag equal to a first value (e.g., 1) and a coded picture that has a picture output flag equal to a second value (e.g., 0), use at least two tracks to store the bitstream in the file. For each respective track from the at least two tracks, all coded pictures in each sample of the respective track have the same value of the picture output flag. Pictures having picture output flags equal to the first value (e.g., 1) are allowed to be output and pictures having picture output flags equal to the second value (e.g., 0) are allowed to be used as reference pictures but are not allowed to be output. The use of at least two tracks may resolve the problem described above, because each sample in each track may be assigned an appropriate output time and a video decoder may not output pictures in the track containing the samples that are not allowed to be output.

While much of the description of the techniques of this disclosure describes MV-HEVC, 3D-HEVC, and SHVC, the reader will appreciate that the techniques of this disclosure may be applicable to other video coding standards and/or extensions thereof.

FIG. 1 is a block diagram illustrating an example video encoding and decoding system 10 that may use the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. Source device 12 and destination device 14 may be considered video devices.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. However, the techniques described in this disclosure may be applicable to video coding in general, and may be applied to wireless and/or wired applications.

Video encoder 20 may encode the captured, pre-captured, or computer-generated video. Source device 12 may transmit the encoded video data directly to destination device 14 via output interface 22 of source device 12. The encoded video data may also (or alternatively) be stored onto storage device 33 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 33, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or may be external to, destination device 14. In some examples, destination device 14 may include an integrated display device and may also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, output interface 22 may output encoded data to a storage device 33. Similarly, input interface 28 may access encoded data storage device 33. Storage device 33 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 may correspond to a file server or another intermediate storage device that may hold the encoded video generated by source device 12. Destination device 14 may access stored video data from storage device 33 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Furthermore, in the example of FIG. 1, video coding system 10 includes a file generation device 34. File generation device 34 may receive encoded video data generated by source device 12. File generation device 34 may generate a file that includes the encoded video data. Destination device 14 may receive the file generated by file generation device 34. In various examples, file generation device 34 may include various types of computing devices. For instance, file generation device 34 may comprise a Media Aware Network Element (MANE), a server computing device, a personal computing device, a special-purpose computing device, a commercial computing device, or another type of computing device. In some examples, file generation device 34 is part of a content delivery network. File generation device 34 may receive the encoded video data from source device 12 via a channel such as link 16. Furthermore, destination device 14 may receive the file from file generation device 34 via a channel such as link 16. File generation device 34 may be considered a video device.

In other examples, source device 12 or another computing device may generate a file that includes the encoded video data. However, for ease of explanation, this disclosure describes file generation device 34 as generating the file. Nevertheless, it should be understood that such descriptions are applicable to computing devices in general.

Video encoder 20 and video decoder 30 may operate according to a video compression standard, such as the High Efficiency Video Coding (HEVC) standard or an extension thereof. The HEVC standard may also be referred to as ISO/IEC 23008-2. Recently, the design of HEVC has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip. The multiview extension to HEVC, namely MV-HEVC, is also being developed by the JCT-3V. A recent Working Draft (WD) of MV-HEVC, titled "MV-HEVC Draft Text 5" and referred to as MV-HEVC WD5 hereinafter, is available from http://phenix.it-sudparis.eu/jct2/doc_end_user/documents/5_Vienna/wg11/JCT3V-E1004-v6.zip. The scalable extension to HEVC, named SHVC, is also being developed by the JCT-VC. A recent Working Draft (WD) of SHVC, titled "High efficiency video coding (HEVC) scalable extension draft 3" and referred to as SHVC WD3 hereinafter, is available from http://phenix.it-sudparis.eu/jct/doc_end_user/documents/14_Vienna/wg11/JCTVC-N1008-v3.zip. A recent working draft (WD) of the range extension of HEVC, is available from available from http://phenix.int-evey.fr/jct/doc_end user/documents/14_Vienna/wg11/JCTVC-N1005-v3.zip. A recent working draft (WD) of the 3D extension of HEVC, namely 3D-HEVC, titled "3D-HEVC Draft Text 1" is available from http://phenix.int-evry.fr/jct2/doc_end_user/documents/5_Vienna/wg11/JCT3V-E1001-v3.zip. Video encoder 20 and video decoder 30 may operate according to one or more of these standards.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264/AVC provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Treeblocks may also be referred to as Coding Tree Units (CTUs). A treeblock has a similar purpose as a macroblock of the H.264/AVC standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node (i.e., coding block) of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may use a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in variable length coding (VLC) may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a slice segment, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. NAL units that contain parameter sets (e.g., video parameter sets (VPSs), sequence parameter sets (SPSs), PPSs, etc.) may be referred to as parameter set NAL units.

This disclosure may refer to a NAL unit that encapsulates an RBSP for a segment slice as a coded slice NAL unit. As defined in the HEVC WD, a slice segment is an integer number of CTUs ordered consecutively in tile scan and contained in a single NAL unit. In contrast, in the HEVC WD, a slice may be an integer number of CTUs contained in one independent slice segment and all subsequent dependent slice segments (if any) that precede the next independent slice segment (if any) within the same access unit. An independent slice segment is a slice segment for which values of the syntax elements of the slice segment header are not inferred from the values for a preceding slice segment. A dependent slice segment is a slice segment for which the values of some syntax elements of the slice segment header are inferred from the values for the preceding independent slice segment in decoding order. The RBSP of a coded slice NAL unit may include a slice segment header and slice data. A slice segment header is a part of a coded slice segment containing the data elements pertaining to the first or all CTUs represented in the slice segment. A slice header is a slice segment header of the independent slice segment that is a current slice segment or the most recent independent slice segment that precedes a current dependent slice segment in decoding order.

A VPS is a syntax structure comprising syntax elements that apply to zero or more entire coded video sequences (CVSs). An SPS is a syntax structure containing syntax elements that apply to zero or more entire CVSs. An SPS may include a syntax element that identifies a VPS that is active when the SPS is active. Thus, the syntax elements of a VPS may be more generally applicable than the syntax elements of a SPS.

A parameter set (e.g., a VPS, SPS, PPS, etc.) may contain an identification that is referenced, directly or indirectly, from a slice header of a slice. The referencing process is known as "activation." Thus, when video decoder 30 is decoding a particular slice, a parameter set referenced, directly or indirectly, by a syntax element in a slice header of the particular slice is said to be "activated." Depending on the parameter set type, the activation may occur on a per picture basis or a per sequence basis. For example, a slice header of a slice may include a syntax element that identifies a PPS. Thus, when a video coder codes the slice, the PPS may be activated. Furthermore, the PPS may include a syntax element that identifies a SPS. Thus, when a PPS that identifies the SPS is activated, the SPS may be activated. The SPS may include a syntax element that identifies a VPS. Thus, when a SPS that identifies the VPS is activated, the VPS is activated.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In the HEVC WD, a CVS may start from an Instantaneous Decoding Refresh (IDR) picture, or a broken link access (BLA) picture, or a clean random access (CRA) picture that is the first picture in the bitstream, including all subsequent pictures that are not IDR or BLA pictures. An IDR picture contains only I slices (i.e., slices in which only intra prediction is used). An IDR picture may be the first picture in the bitstream in decoding order, or may appear later in the bitstream. Each IDR picture is the first picture of a CVS in decoding order. In the HEVC WD, an IDR picture may be an intra random access point (IRAP) picture for which each VCL NAL unit has a nal_unit_type equal to IDR_W_RADL or IDR_N_LP.

IDR pictures may be used for random access. However, pictures following an IDR picture in decoding order cannot use pictures decoded prior to the IDR picture as reference. Accordingly, bitstreams relying on IDR pictures for random access can have significantly lower coding efficiency than bitstreams that use additional types of random access pictures. In at least some examples, an IDR access unit is an access unit that contains an IDR picture.

The concept of CRA pictures was introduced in HEVC to allow pictures that follow a CRA picture in decoding order, but precede the CRA picture in output order, to use pictures decoded before the CRA picture for reference. Pictures that follow a CRA picture in decoding order, but precede the CRA picture in output order, are referred to as leading pictures associated with the CRA picture (or leading pictures of the CRA picture). That is, to improve coding efficiency, the concept of CRA pictures was introduced in HEVC to allow pictures that follow a CRA picture in decoding order but precede the CRA picture in output order to use pictures decoded before the CRA picture for reference. A CRA access unit is an access unit in which the coded picture is a CRA picture. In the HEVC WD, a CRA picture is an intra random access picture for which each VCL NAL unit has a nal_unit_type equal to CRA NUT.

The leading pictures of a CRA picture are correctly decodable if the decoding starts from an IDR picture or a CRA picture occurring before the CRA picture in decoding order. However, the leading pictures of a CRA picture may be non-decodable when random access from the CRA picture occurs. Hence, a video decoder typically decodes the leading pictures of a CRA picture during random access decoding. To prevent error propagation from reference pictures that may not be available depending on where the decoding starts, no picture that follows a CRA picture both in decoding order and output order may use any picture that precedes the CRA picture either in decoding order or output order (which includes the leading pictures) for reference.

The concept of a BLA picture was introduced in HEVC after the introduction of CRA pictures and is based on the concept of CRA pictures. A BLA picture typically originates from bitstream splicing at the position of a CRA picture, and in the spliced bitstream, the splicing point CRA picture is changed to a BLA picture. Thus, BLA pictures may be CRA pictures at the original bitstreams and a CRA picture is changed to be a BLA picture by the bitstream splicer after bitstream splicing at the location of the CRA picture. In some instances, an access unit that contains a RAP picture may be referred to herein as a RAP access unit. A BLA access unit is an access unit that contains a BLA picture. In the HEVC WD, a BLA picture may be an intra random access picture for which each VCL NAL unit has nal_unit_type equal to BLA_W_LP, BLA_W_RADL, or BLA_N_LP.

In general, an IRAP picture contains only I slices, and may be a BLA picture, a CRA picture, or an IDR picture. For instance, the HEVC WD indicates that an IRAP picture may be a coded picture for which each VCL NAL unit has nal_unit_type in the range of BLA_W_LP to RSV_I-RAP_VCL23, inclusive. Furthermore, the HEVC WD indicates that the first picture in the bitstream in decoding order must be an IRAP picture. Table 7-1 of HEVC WD shows the NAL unit type codes and NAL unit type classes. Table 7-1 of HEVC WD is reproduced below.

TABLE 7-1

NAL unit type codes and NAL unit type classes

| nal_unit_type | Name of nal_unit_type | Content of NAL unit and RBSP syntax structure | NAL unit type class |
| --- | --- | --- | --- |
| 0 | TRAIL_N | Coded slice segment of a non-TSA, non-STSA trailing picture slice_segment_layer_rbsp( ) | VCL |
| 1 | TRAIL_R | | |

TABLE 7-1-continued

NAL unit type codes and NAL unit type classes

| nal_unit_type | Name of nal_unit_type | Content of NAL unit and RBSP syntax structure | NAL unit type class |
|---|---|---|---|
| 2<br>3 | TSA_N<br>TSA_R | Coded slice segment of a TSA picture<br>slice_segment_layer_rbsp( ) | VCL |
| 4<br>5 | STSA_N<br>STSA_R | Coded slice segment of an STSA picture<br>slice_segment_layer_rbsp( ) | VCL |
| 6<br>7 | RADL_N<br>RADL_R | Coded slice segment of a RADL picture<br>slice_segment_layer_rbsp( ) | VCL |
| 8<br>9 | RASL_N<br>RASL_R | Coded slice segment of a RASL picture<br>slice_segment_layer_rbsp( ) | VCL |
| 10<br>12<br>14 | RSV_VCL_N10<br>RSV_VCL_N12<br>RSV_VCL_N14 | Reserved non-IRAP sub-layer non-reference VCL NAL unit types | VCL |
| 11<br>13<br>15 | RSV_VCL_R11<br>RSV_VCL_R13<br>RSV_VCL_R15 | Reserved non-IRAP sub-layer reference VCL NAL unit types | VCL |
| 16<br>17<br>18 | BLA_W_LP<br>BLA_W_RADL<br>BLA_N_LP | Coded slice segment of a BLA picture<br>slice_segment_layer_rbsp( ) | VCL |
| 19<br>20 | IDR_W_RADL<br>IDR_N_LP | Coded slice segment of an IDR picture<br>slice_segment_layer_rbsp( ) | VCL |
| 21 | CRA_NUT | Coded slice segment of a CRA picture<br>slice_segment_layer_rbsp( ) | VCL |
| 22<br>23 | RSV_IRAP_VCL22<br>RSV_IRAP_VCL23 | Reserved IRAP VCL NAL unit types | VCL |
| 24 ... 31 | RSV_VCL24..RSV_VCL31 | Reserved non-IRAP VCL NAL unit types | VCL |
| 32 | VPS_NUT | Video parameter set<br>video_parameter_set_rbsp( ) | non-VCL |
| 33 | SPS_NUT | Sequence parameter set<br>seq_parameter_set_rbsp( ) | non-VCL |
| 34 | PPS_NUT | Picture parameter set<br>pic_parameter_set_rbsp( ) | non-VCL |
| 35 | AUD_NUT | Access unit delimiter<br>access_unit_delimiter_rbsp( ) | non-VCL |
| 36 | EOS_NUT | End of sequence<br>end_of_seq_rbsp( ) | non-VCL |
| 37 | EOB_NUT | End of bitstream<br>end_of_bitstream_rbsp( ) | non-VCL |
| 38 | FD_NUT | Filler data<br>filler_data_rbsp( ) | non-VCL |
| 39<br>40 | PREFIX_SEI_NUT<br>SUFFIX_SEI_NUT | Supplemental enhancement information<br>sei_rbsp( ) | non-VCL |
| 41 ... 47 | RSV_NVCL41 ... RSV_NVCL47 | Reserved | non-VCL |
| 48 ... 63 | UNSPEC48 ... UNSPEC63 | Unspecified | non-VCL |

One difference between BLA pictures and CRA pictures is as follows. For a CRA picture, the associated leading pictures are correctly decodable if the decoding starts from a RAP picture before the CRA picture in decoding order. However, the leading pictures associated with a CRA picture may not be correctly decodable when random access from the CRA picture occurs (i.e., when decoding starts from the CRA picture, or in other words, when the CRA picture is the first picture in the bitstream). In contrast, there may be no scenario where the leading pictures associated with a BLA picture are decodable, even when decoding starts from a RAP picture before the BLA picture in decoding order.

Some of the leading pictures associated with a particular CRA picture or a particular BLA picture may be correctly decodable even when the particular CRA picture or the particular BLA picture is the first picture in a bitstream. These leading pictures may be referred to as decodable leading pictures (DLPs) or Random Access Decodable Leading (RADL) pictures. In the HEVC WD, a RADL picture may be a coded picture for which each VCL NAL unit has a nal_unit_type equal to RADL_R or RADL_N. Furthermore, the HEVC WD indicates that all RADL pictures are leading pictures and that RADL pictures are not used as reference pictures for the decoding process of trailing pictures of the same associated IRAP picture. When present, all RADL pictures precede, in decoding order, all trailing pictures of the same associated IRAP picture. The HEVC WD indicates that a RADL access unit may be an access unit in which the coded picture is a RADL picture. A trailing picture may be a picture that follows the associated IRAP picture (i.e., the previous IRAP picture in decoding order) in output order.

Other leading pictures may be referred to as non-decodable leading pictures (NLPs) or Random Access Skipped Leading (RASL) pictures. In the HEVC WD, a RASL picture may be a coded picture for which each VCL NAL unit has a nal_unit_type equal to RASL_R or RASL_N. All RASL pictures are leading pictures of an associated BLA or CRA picture.

Provided that necessary parameter sets are available when they need to be activated, an IRAP picture and all subsequent non-RASL pictures in decoding order can be correctly decoded without performing the decoding process of any pictures that precede the IRAP picture in decoding order. There may be pictures in a bitstream that contain only I slices that are not IRAP pictures.

In multi-view coding, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence or set of view components associated with the same view identifier. A view component may contain a texture view component and a depth view component. In this disclosure, a "view" may refer to a set or sequence of one or more view components associated with the same view identifier.

A texture view component (i.e., a texture picture) may be a coded representation of the texture of a view in a single access unit. A texture view may be a sequence of texture view components associated with an identical value of a view order index. A view order index of a view may indicate a camera position of the view relative to other views. A depth view component (i.e., a depth picture) may be a coded representation of the depth of a view in a single access unit. A depth view may be a set or sequence of one or more depth view components associated with an identical value of view order index.

In MV-HEVC, 3D-HEVC and SHVC, a video encoder may generate a bitstream that comprises a series of NAL units. Different NAL units of the bitstream may be associated with different layers of the bitstream. A layer may be defined as a set of VCL NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In some examples of 3D video coding, a layer may contain either all coded depth pictures of a specific view or coded texture pictures of a specific view. In other examples of 3D video coding, a layer may contain both texture view components and depth view components of a specific view. Similarly, in the context of scalable video coding, a layer typically corresponds to coded pictures having video characteristics different from coded pictures in other layers. Such video characteristics typically include spatial resolution and quality level (e.g., Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream may be removed from the bitstream without affecting the decodability of data in the remaining layers of the bitstream. In multi-view coding and 3D-HEVC, higher layers may include additional view components. In SHVC, higher layers may include signal to noise ratio (SNR) enhancement data, spatial enhancement data, and/or temporal enhancement data. In MV-HEVC, 3D-HEVC and SHVC, a layer may be referred to as a "base layer" if a video decoder can decode pictures in the layer without reference to data of any other layer. The base layer may conform to the HEVC base specification (e.g., HEVC WD).

In SVC, layers other than the base layer may be referred to as "enhancement layers" and may provide information that enhances the visual quality of video data decoded from the bitstream. SVC can enhance spatial resolution, signal-to-noise ratio (i.e., quality) or temporal rate. In scalable video coding (e.g., SHVC), a "layer representation" may be a coded representation of a spatial layer in a single access unit. For ease of explanation, this disclosure may refer to view components and/or layer representations as "view components/layer representations" or simply "pictures."

To implement the layers, headers of NAL units may include nuh_reserved_zero_6bits syntax elements. In the HEVC WD, the nuh_reserved_zero_6bits syntax element is reserved. However, in MV-HEVC, 3D-HEVC, and SVC, the nuh_reserved_zero_6bits syntax element is referred to as the nuh_layer_id syntax element. The nuh_layer_id syntax element specifies an identifier of a layer. NAL units of a bitstream that have nuh_layer_id syntax elements that specify different values belong to different layers of the bitstream.

In some examples, the nuh_layer_id syntax element of a NAL unit is equal to 0 if the NAL unit relates to a base layer in multi-view coding (e.g., MV-HEVC), 3DV coding (e.g., 3D-HEVC), or scalable video coding (e.g., SHVC). Data in a base layer of a bitstream may be decoded without reference to data in any other layer of the bitstream. If a NAL unit does not relate to a base layer in multi-view coding, 3DV, or scalable video coding, the nuh_layer_id syntax element of the NAL unit may have a non-zero value.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers (i.e., TemporalIds) of the NAL units. The temporal identifier of a NAL unit identifies a sub-layer to which the NAL unit belongs. Thus, each sub-layer of a bitstream may have a different temporal identifier. In general, if the temporal identifier of a first NAL unit of a layer is less than the temporal identifier of a second NAL unit of the same layer, the data encapsulated by the first NAL unit may be decoded without reference to the data encapsulated by the second NAL unit.

A bitstream may be associated with a plurality of operation points. Each operation point of a bitstream is associated with a set of layer identifiers (e.g., a set of nuh_layer_id values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. Thus, an operation point may correspond to a subset of NAL units in the bitstream.

As introduced above, this disclosure relates to storing of video content in a file based on ISO base media file format (ISOBMFF). In particular, this disclosure describes various techniques for storing of video streams containing multiple coded layers, wherein each layer may be a scalable layer, a texture view, a depth view, or other types of layers or views. The techniques of this disclosure may be applied to, for example, storage of MV-HEVC video data, SHVC video data, 3D-HEVC video data, and/or other types of video data.

File formats and file format standards will now be briefly discussed. File format standards include ISO base media file format (ISOBMFF, ISO/IEC 14496-12, hereinafter, "ISO/IEC 14996-12") and other file format standards derived from the ISOBMFF, including MPEG-4 file format (ISO/IEC 14496-14), 3GPP file format (3GPP TS 26.244) and AVC file format (ISO/IEC 14496-15, hereinafter "ISO/IEC 14996-15"). Thus, ISO/IEC 14496-12 specifies the ISO base media file format. Other documents extend the ISO base media file format for specific applications. For example, ISO/IEC 14496-15 describes the carriage of NAL unit structured video in the ISO base media file format. H.264/AVC and HEVC, as well as their extensions, are examples of NAL unit structured video. ISO/IEC 14496-15 includes sections describing the carriage of H.264/AVC NAL units. Additionally, section 8 of ISO/IEC 14496-15 describes the carriage of HEVC NAL units.

The ISOBMFF is used as the basis for many codec encapsulation formats, such as the AVC File Format, as well as for many multimedia container formats, such as the MPEG-4 File Format, the 3GPP File Format (3GP), and the DVB File Format. In addition to continuous media, such as audio and video, static media, such as images, as well as metadata, can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams. Thus, although originally designed for storage, the ISOBMFF has proven valuable for streaming, e.g. for progressive download or DASH. For streaming purposes, the movie fragments defined in ISOBMFF can be used.

Figure 5:
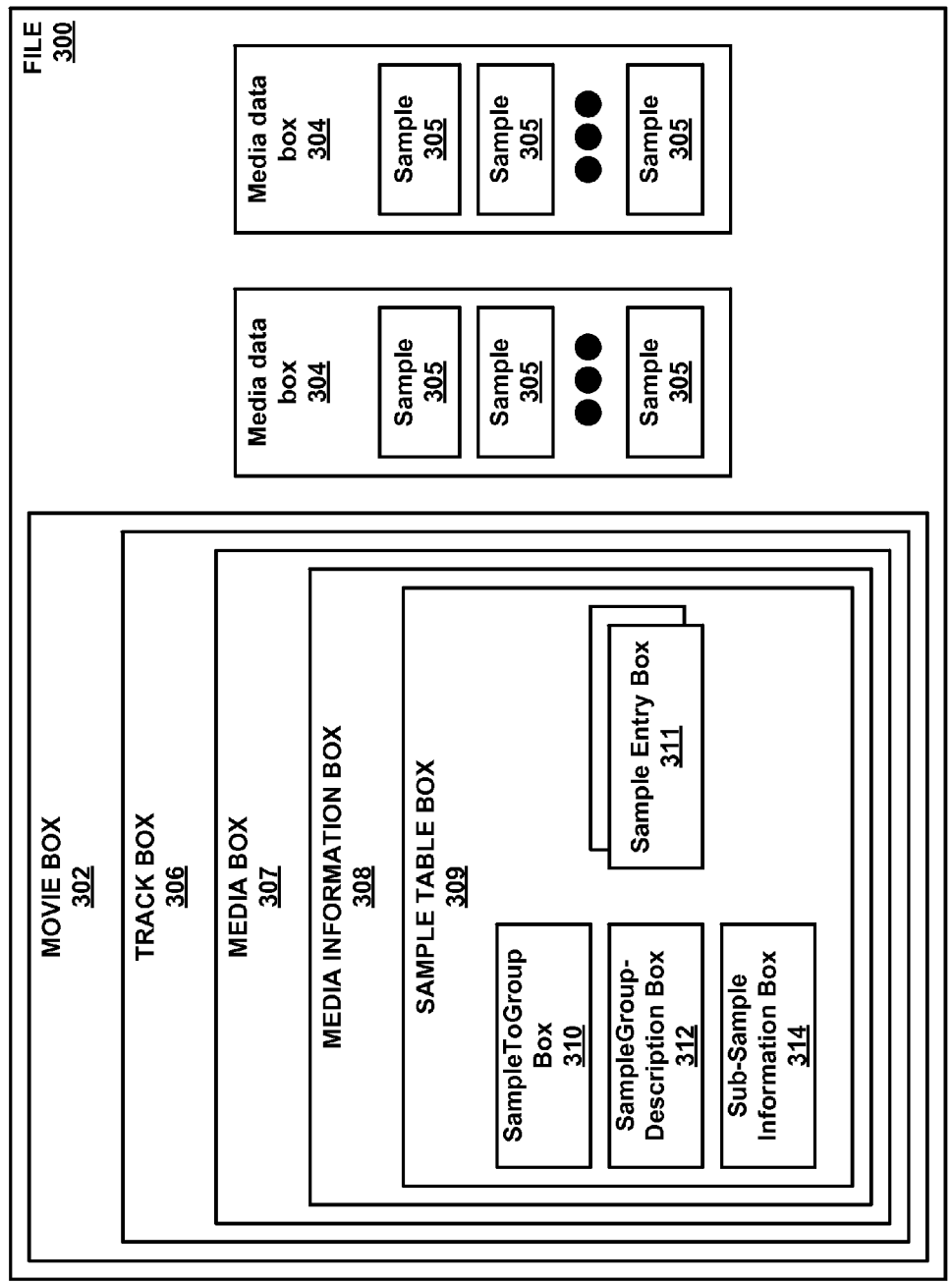
FIG. 5 is a conceptual diagram illustrating an example structure of a file, in accordance with one or more techniques of this disclosure.
Figure 6:
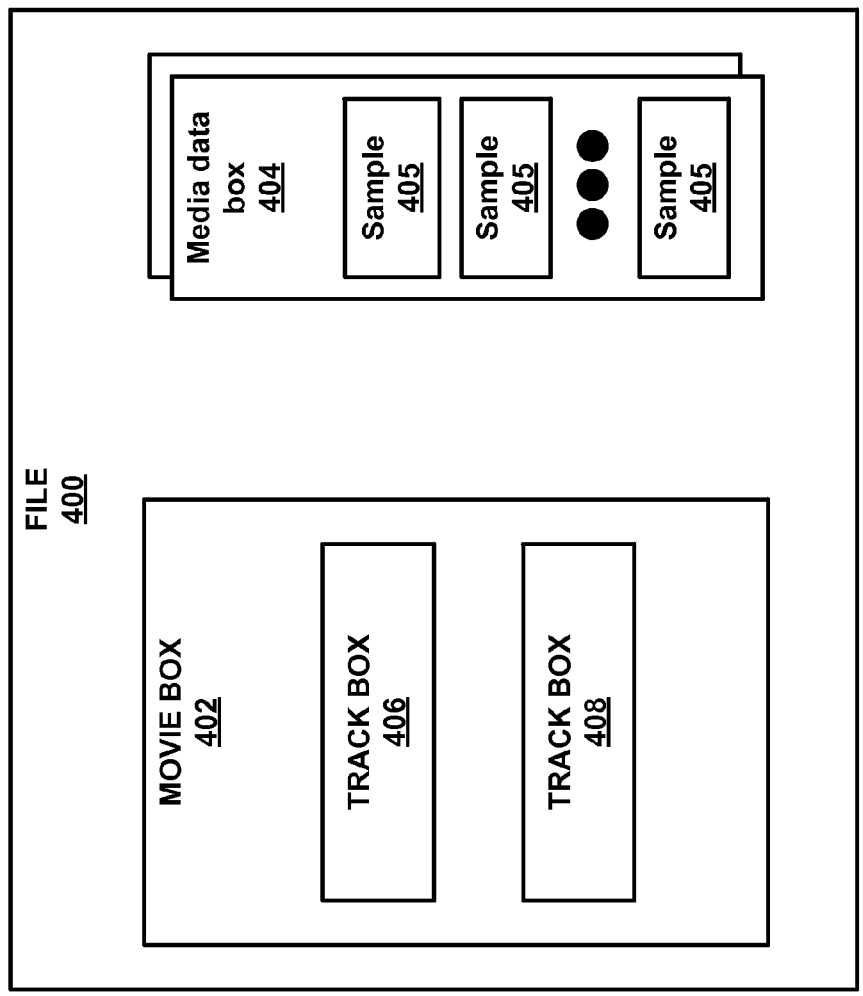
FIG. 6 is a conceptual diagram illustrating an example structure of a file, in accordance with one or more techniques of this disclosure.

A file conforming to the HEVC file format may comprise a series of objects, called boxes. A box may be an object-oriented building block defined by a unique type identifier and length. For instance, a box may be the elementary syntax structure in the ISOBMFF, including a four-character coded box type, a byte count of the box, and a payload. In other words, a box may be a syntax structure comprising a coded box type, a byte count of the box, and a payload. In some instances, all data in a file conforming to the HEVC file format may be contained within boxes and there may be no data in the file that is not in a box. Thus, an ISOBMFF file may consist of a sequence of boxes, and boxes may contain other boxes. For instance, the payload of a box may include one or more additional boxes. FIG. 5 and FIG. 6, described in detail elsewhere in this disclosure, show example boxes within a file, in accordance with one or more techniques of this disclosure.

A file conforming to the ISOBMFF may include various types of boxes. For example, a file conforming to the ISOBMFF may include a file type box, a media data box, a movie box, a movie fragment box, and so on. In this example, a file type box includes file type and compatibility information. A media data box may contain samples (e.g., coded pictures). A Movie box ("moov") contains metadata for continuous media streams present in the file. Each of the continuous media streams may be represented in the file as a track. For instance, a movie box may contain metadata regarding a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing of media samples in the track. Information in the sample table box may be used to locate samples in time and, for each of the samples of the track, a type, size, container, and offset into that container of the sample. Thus, the metadata for a track is enclosed in a Track box ("trak"), while the media content of a track is either enclosed in a Media Data box ("mdat") or directly in a separate file. The media content for tracks comprises (e.g., consists of) a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is a box within a Sample Table box. The Sync Sample box is used to list the random access samples of the track. This disclosure may refer to a sample listed by the Sync Sample box as a sync sample. In another example, a sample grouping mechanism enables mapping of samples according to a four-character grouping type into groups of samples sharing the same property specified as a sample group description entry in the file. Several grouping types have been specified in the ISOBMFF.

A sample table box may include one or more SampleToGroup boxes and one or more sample group description boxes (i.e., SampleGroupDescription boxes). A SampleToGroup box may be used to determine a sample group to which a sample belongs, along with an associated description of the sample group. In other words, a SampleToGroup box may indicate a group to which a sample belongs. A SampleToGroup box may have a box type of "sbgp." A SampleToGroup box may include a grouping type element (e.g., grouping_type). The grouping type element may be an integer that identifies a type (i.e., a criterion used to form the sample groups) of a sample grouping. Furthermore, a SampleToGroup box may include one or more entries. Each entry in a SampleToGroup box may be associated with a different, non-overlapping series of consecutive samples in the track. Each entry may indicate a sample count element (e.g., sample_count) and a group description index element (e.g., group_description_index). The sample count element of an entry may indicate a number of samples associated with the entry. In other words, the sample count element of the entry may be an integer that gives the number of consecutive samples with the same sample group descriptor. The group description index element may identify a SampleGroupDescription box that contains a description of the samples associated with the entry. The group description index elements of multiple entries may identify the same SampleGroupDescription box.

Current file format designs may have one or more problems. To store video content of a particular video codec based on the ISOBMFF, a file format specification to that video codec may be needed. For storage of video streams containing multiple layers such as MV-HEVC and SHVC, it is possible to reuse some of the concepts from the SVC and MVC file format. However, many parts cannot be directly used for SHVC and MV-HEVC video streams. Direct application of the HEVC file format has at least the following shortcomings: SHVC and MV-HEVC bitstreams can start with an access unit that contains IRAP picture in the base layer, but may also contain other non-IRAP pictures in other layers or vice versa. The sync sample currently does not allow indication of such a point for random access.

This disclosure describes potential solutions to the above problems, as well as provides other potential improvements, to enable efficient and flexible storage of video streams containing multiple layers. The techniques described in this disclosure potentially apply to any file format for storing of such video content coded by any video codec, though the description is specific to storage of SHVC and MV-HEVC video streams based on the HEVC file format, which is specified in Clause 8 of ISO/IEC 14496-15.

Detailed implementation of the techniques of this disclosure will be discussed in detail below. The techniques of this disclosure may be summarized in the following examples. The following examples may be used separately. Alternatively, various combinations of the following examples can be used together.

In a first example, Compressorname is a value specified in a VisualSampleEntry box. As described in section 8.5.2.1 of ISO/IEC 14496-12, a VisualSampleEntry box is a type of sample table box for video tracks that stores detailed information about the coding type used and any initialization information needed for that coding. Compressorname indicates a name of a compressor used to generate media data. A video decoder may use the value of the Compressorname to determine how and/or whether to decode the video data in the file. As defined in section 8.5.3 of ISO/IEC 14496-12, Compressorname is formatted in a fixed 32-byte field, with the first byte set to the number of bytes to be displayed, followed by that number of bytes of displayable data, and then padding to complete 32 bytes total (including the size byte).

The first example allows two new values of Compressorname. The first new value of Compressorname is "\013SHVC Coding," for the file containing SHVC video streams. The second new value of Compressorname is "\016MV-HEVC Coding" for the file containing MV-HEVC video streams. This first example may be implemented as shown in sections 9.5.3.1.3 and 10.5.3.2, below.

As described briefly above, a file may include a movie box that contains metadata for tracks of the file. The movie box may include a track box for each track of the file. Furthermore, a track box may include a media information box that contains all objects that declare characteristic information of the media of the track. The media information box may include a sample table box. The sample table box may specify sample-specific metadata. For instance, the sample table box may include a plurality of sample description boxes. Each of the sample description boxes may be an instance of a sample entry. In ISO/IEC 14496-12, instances of a VisualSampleEntry class may be used as sample entries. Classes of sample entries specific to particular video coding standards may extend the VisualSampleEntry class. For example, a class of sample entries specific to HEVC may extend the VisualSampleEntry class. Thus, this disclosure may refer to the different classes extending the VisualSampleEntry class as different sample entry types.

In a second example, two new sample entry (i.e., "sample") types, "hev2" and "hvc2," are defined for HEVC tracks. The two new sample entry types allow the use of aggregators and extractors. In general, an aggregator aggregates multiple NAL units in the form of a single aggregated data unit. For instance, an aggregator may contain multiple NAL units and/or may virtually concatenate multiple NAL units. In general, an extractor indicates a type of data obtained from other tracks. For instance, storage of media data (e.g., HEVC data) over multiple tracks may result in compact files because duplication of data may be avoided by referencing data across media tracks using relatively small data units called Extractors which are embedded as a NAL unit in media data. This second example may be implemented as shown in sections 9.5.3.1.1, 9.5.3.1.2, 9.5.4, 9.5.6, 10.4.5, 10.5.3.1.1.1, and 10.5.3.2, below.

In a third example, the definition of a sample entry that is associated with a particular requirement on the storage of parameter sets for a multi-layer bitstream is modified in order to enable convenient random accessing to a particular layer or a particular operation point. For instance, when an SHVC, MV-HEVC, or 3D-HEVC track has the sample entry and when a sample contains at least one IRAP picture, all parameters needed for decoding that sample shall be included in the sample entry or that sample itself. In this example, when a sample does not contain any IRAP pictures, all parameter sets (e.g., VPSs, SPSs, PPSs) needed for decoding that sample shall be included either in the sample entry or in any of the samples since the previous sample containing at least one IRAP picture to that sample itself, inclusive. This third example may be implemented as shown in section 9.5.3.1.1, below.

In one alternative version of the third example, when an SHVC, MV-HEVC, or 3D-HEVC track has the sample entry and when a picture in a sample is an IRAP picture, all parameter sets needed for decoding that picture shall be included in the sample entry or in that sample itself. Furthermore, in this alternative, when the sample does not contain any IRAP pictures, all parameter sets needed for decoding the picture shall be included either in the sample entry or in any of the samples following the previous sample containing at least an IRAP picture in the same layer to that sample itself, inclusive.

In a fourth example, the following cases for existing sample entry types are defined. In this example, samples belonging to sample entry types "hev1" and "hvc1" contain HEVC, SHVC, and MV-HEVC configurations for SHVC and MV-HEVC tracks with HEVC VCL NAL units. Furthermore, sample entry types "hev1" and "hvc1" containing SHVC and MV-HEVC configurations are defined for SHVC and MV-HEVC tracks without HEVC NAL units but with VCL NAL units with nuh_layer_id greater than 0, where extractors are not allowed. This fourth example may be implemented as shown in section 9.5.3.1.1, below.

In a fifth example, a sync sample in a SHVC, an MV-HEVC, or a 3D-HEVC track is defined to be a sample that contains pictures that are all IRAP pictures. This fifth example may be implemented as shown in sections 9.5.5 and 10.4.3, below. As specified in section 9.5.5, below, an SHVC sample is considered to be a sync sample if each coded picture in the access unit is an IRAP picture, as defined in the HEVC WD. Furthermore, as specified in section 10.4.3, below, an MV-HEVC sample is considered to be a sync sample if each coded picture in the access unit is an IRAP picture without RASL pictures, as defined in the HEVC WD.

Thus, in the fifth example, as part of generating a file, file generation device 34 may generate a sync sample box that includes a sync sample table that documents sync samples of a track of multi-layer video data. Each sync sample of the track is a random access sample of the track. A scalable video coding sample is a sync sample if each coded picture in an access unit is an IRAP picture. A multi-view video coding sample is a sync sample if each coded picture in the access unit is an IRAP picture without RASL pictures.

In an alternative version of the fifth example, a sync sample in a SHVC, an MV-HEVC, or a 3D-HEVC track is defined to be a sample that contains pictures that are all IRAP pictures without RASL pictures. The sync sample table documents sync samples. Optionally, a sync sample sample group documents sync samples. In other words, a sync sample sample group includes information identifying sync samples.

In a sixth example, a "rap" sample group is defined to contain those samples that contain pictures that are all IRAP pictures (with or without RASL pictures). This sixth example may be implemented as shown in section 9.5.5, below. Alternatively, in the sixth example, the "rap" sample group is defined to contain those samples that contain pictures that are all IRAP pictures but to exclude those samples that are indicated as sync samples.

In a seventh example, a new sample group or a new box is defined that documents all samples containing at least one IRAP picture, the NAL unit type of the VCL NAL units in the IRAP pictures in the sample, whether all the coded pictures in the sample are IRAP pictures, and if not, the number of IRAP pictures in the sample, and the layer ID values of these IRAP pictures in the sample.

Thus, in this seventh example, file generation device 34 may generate a file that comprises a track box that contains metadata for a track in the file. Media data for the track comprises a sequence of samples. Each of the samples may be an access unit of multi-layer video data. As part of generating the file, file generation device 34 generates, in the file, an additional box that documents all of the samples containing at least one IRAP picture.

This seventh example may be implemented in part as shown in section 9.5.5.1, below. As shown in section 9.5.5.1, below, a Random Accessible Sample Entry class extends a VisualSampleGroupEntry class. Instances of the Random Accessible Sample Entry class (i.e., Random Accessible Sample Entry boxes) correspond to samples containing at least one IRAP picture. Furthermore, a Random Accessible Sample Entry box includes an all_pics_are_IRAP value that specifies whether all coded pictures in the corresponding sample are IRAP pictures.

Thus, in the seventh example, file generation device 34 may generate a sample entry that includes a value (e.g., all_pics_are_IRAP). The value being equal to 1 specifies that each coded picture in a sample is an IRAP picture. The value being equal to 0 specifies that not all coded picture in the sample are IRAP pictures.

Furthermore, in accordance with the seventh example, when not all coded pictures of a sample are IRAP pictures, file generation device 34 may include, in the sample entry corresponding to the sample, a value indicating a number of IRAP pictures in each sample of the sample group. Additionally, when not all coded pictures in the sample are IRAP pictures, file generation device 34 may include, in the sample entry corresponding to the sample, values indicating layer identifiers of IRAP pictures in the sample.

Alternatively, in the seventh example, the new sample group or new box documents such samples but excluding those that are indicated as sync samples or members of the "rap" sample group.

This seventh example may resolve one or more problems that may arise when multi-layer video data is stored using the ISOBMFF or existing extensions thereof. For instance, in single layer video coding, there is typically only a single coded picture per access unit. However, in multi-layer video coding, there is typically more than one coded picture per access unit. The ISOBMFF and the existing extensions thereof do not provide a way of indicating which samples include one or more IRAP pictures. This may hinder the ability of a computing device to locate random access points in a file or to perform layer switching. For instance, in the absence of information indicating which of the samples contain one or more IRAP pictures, the computing device may need to parse and interpret NAL units in order to determine whether an access unit can be used as a random access point and/or for layer switching. Parsing and interpreting NAL units may add complexity to the computing device and may consume time and processing resources. Furthermore, some computing devices that perform random access and/or layer switching, such as streaming servers, are not configured to parse or interpret NAL units.

In an eighth example, the introduction of a new type of sub-sample is included, where each sub-sample contains one coded picture and its associated non-VCL NAL units. This eighth example may be implemented as shown in section 9.5.8, below. Thus, in this eighth example, file generation device 34 may generate a file that comprises a track box that contains metadata for a track in the file. Media data for the track comprises a sequence of samples. Each of the samples is an access unit of multi-layer video data. As part of generating the file, file generation device 34 generates, in the file, a sub-sample information box that contains flags that specify a type of sub-sample information given in the sub-sample information box. When the flags have a particular value, a sub-sample corresponding to the sub-sample information box contains exactly one coded picture and zero or more non-VCL NAL units associated with the coded picture.

This eighth example may resolve one or more problems that may arise when multi-layer video data is stored using ISOBMFF or existing extensions thereof. For instance, in multi-layer video coding, there may be multiple coded pictures per sample. For example, there may be one or more pictures in the sample for each layer. However, in the extension of ISOBMFF for H.264/AVC and HEVC, the sub-sample information box does not provide information about individual pictures within a sample when the sample includes multiple pictures. The techniques of this eighth example may resolve this problem by providing a new type of sub-sample information box that provides information about a sub-sample that contains only one coded picture and non-VCL NAL units associated with the coded picture. Providing information about an individual coded picture in the file structure, as opposed to only providing such information within the NAL units associated with the coded picture, may enable a computing device to determine the information about the coded picture without having to interpret the NAL units. In some instances, in order to decrease the complexity of the computing device and/or increase the throughput of the computing device, the computing device is not configured to interpret the NAL units. In some examples where a computing device is streaming NAL units stored in a file, the computing device may use the information in the sub-sample information box to determine whether to forward the NAL units of the sub-sample to a client device.

A ninth example relates to the handling of non-output samples in a multi-layer context. Particularly, in the ninth example, when an access unit contains some coded pictures that have pic_output_flag equal to 1 and some other coded pictures that have pic_output_flag equal to 0, at least two tracks must be used to store the stream, such that within each track all coded pictures in each sample have the same value of pic_output_flag. This ninth example may be implemented as shown in section 9.5.9, below.

Thus, in this ninth example, file generation device 34 may generate a file that comprises a media data box that encloses media content. The media content comprises a sequence of samples. Each of the samples is an access unit of the multi-layer video data. Responsive to a determination that at least one access unit of a bitstream of the multi-layer video data includes a coded picture that has a picture output flag (e.g., pic_output_flag) equal to 1 and a coded picture that has a picture output flag equal to 0, file generation device 34 may use at least two tracks to store the bitstream in the file. For each respective track from the at least two tracks, all coded pictures in each sample of the respective track have the same value of the picture output flag.

This ninth example may resolve one or more problems that may arise when multi-layer video data is stored using the ISOBMFF or existing extensions thereof. For instance, if a single track were used to store coded pictures that had picture output flags equal to 0 and picture output flags equal to 1, various file formatting rules would be violated. For example, file formatting rules typically require that there is only one sample in a track per time instant. If a single track stored coded pictures that had picture output flags equal to 0 and picture output flags equal to 1, there would be multiple samples in a track per time instant. Forcing coded pictures that have different values of the picture output flag to be in different tracks of a file may resolve this problem.

An example implementation of some techniques of this disclosure is described below. The example implementation described below is based on the latest integrated specification of 14496-15 in MPEG output document W13478. Changes to Annex A (shown with underlining) and the sections added (Section 9 for SHVC and Section 10 for MV-HEVC) are included below. In other words, particular examples of this disclosure may modify Annex A of ISO/IEC 14496-15 and may add sections 9 and/or 10 to ISO/IEC 14496-15. Text shown with underlining and double underlining may be of particular relevance to the examples of this disclosure. Although the term SHVC is used in various places in the examples described herein, the design of this disclosure is actually not only just to support the SHVC codec, but instead all multi-layer codec, including MV-HEVC, 3D-HEVC can be supported, unless otherwise explicitly mentioned.

9 SHVC Elementary Streams and Sample Definitions 9.1 Introduction

This clause specifies the storage format of SHVC data. It extends the definitions of the storage format of HEVC in clause 8.

The file format for storage of SHVC content, as defined in this clause and Annexes A to D, uses the existing capabilities of the ISO base media file format and the plain HEVC file format (i.e. the file format specified in clause 8). In addition, the following structures or extensions, among others, to support SHVC-specific features are used.

Aggregator:
   a structure to enable efficient scalable grouping of NAL units by changing irregular patterns of NAL units into regular patterns of aggregated data units.

Extractor:
   a structure to enable efficient extraction of NAL units from other tracks than the one containing the media data.

Temporal Metadata Statements:
   structures for storing time-aligned information of media samples.

HEVC Compatibility:
   a provision for storing an SHVC bitstream in an HEVC compatible manner, such that the HEVC compatible base layer can be used by any plain HEVC file format compliant reader.

9.2 Elementary Stream Structure

SHVC streams are stored in accordance with 8.2, with the following definition of an SHVC video elementary stream:
   SHVC video elementary streams shall contain all video coding related NAL units (i.e. those NAL units containing video data or signalling video structure) and may contain non-video coding related NAL units such as SEI messages and access unit delimiter NAL units. Also Aggregators (see A.2) or Extractors (see A.3) may be present. Aggregators and Extractors shall be processed as defined in this International Standard (e.g. shall not directly be placed in the output buffer while accessing the file). Other NAL units that are not expressly prohibited may be present, and if they are unrecognized they should be ignored (e.g. not placed in the output buffer while accessing the file).

SHVC streams shall not be stored using associated parameter set streams.

There may be VCL NAL units with nuh_layer_id equal to 0, VCL NAL units with nuh_layer_id greater than 0, and non-VCL NAL units present in an SHVC video elementary stream. Additionally, there may be Aggregator NAL units and Extractor NAL units present in an SHVC video elementary stream.

9.3 Use of Plain HEVC File Format

The SHVC file format is an extension of the plain HEVC file format defined in clause 8.

9.4 Sample and Configuration Definitions 9.4.1 Introduction

SHVC Sample: An SHVC sample is also an access unit as defined in Annex H of ISO/IEC 23008-2.

9.4.2 Canonical Order and Restrictions
9.4.2.1 Restrictions

The following restrictions apply to SHVC data in addition to the requirements in 8.3.2.

VCL NAL units: All VCL NAL units in one access unit shall be contained in the sample whose composition time is that of the picture represented by the access unit. An SHVC sample shall contain at least one VCL NAL unit.

Aggregators/Extractors: The order of all NAL units included in an Aggregator or referenced by an Extractor is exactly the decoding order as if these NAL units were present in a sample not containing Aggregators/Extractors. After processing the Aggregator or the Extractor, all NAL units must be in valid decoding order as specified in ISO/IEC 23008-2.

9.4.2.2 Decoder Configuration Record

When the decoder configuration record defined in 8.3.3.1 is used for a stream which can be interpreted as either an SHVC or HEVC stream, the HEVC decoder configuration record shall reflect the properties of the HEVC compatible base layer, e.g. it shall contain only parameter sets needed for decoding the HEVC base layer.

The SHVCDecoderConfigurationRecord is structurally identical to an HEVCDecoderConfigurationRecord. The syntax is as follows:

```
aligned(8) class SHVCDecoderConfigurationRecord {
    // same fields as in HEVCDecoderConfigurationRecord syntax
    stucture
}
```

The semantics of the fields in SHVCDecoderConfigurationRecord are the same as defined for an HEVCDecoderConfigurationRecord.

9.5 Derivation from the ISO Base Media File Format
9.5.1 SHVC track structure A scalable video stream is represented by one or more video tracks in a file. Each track represents one or more operating points of the scalable stream. A scalable stream may, of course, be further thinned, if desired.

Let the lowest operating point be the one of all the operating points that contains NAL units with nuh_layer_id equal to 0 only and TemporalId equal to 0 only. A track that contains the lowest operating point shall be nominated as the 'scalable base track.' All the other tracks that are part of the same scalable encoded information shall be linked to this base track by means of a track reference of type 'sbas' (scalable base). All the tracks sharing the same scalable base track must share the same timescale as the scalable base track.

9.5.2 Data Sharing and Extraction

Different tracks may logically share data. This sharing can take one of the following two forms:

a) The sample data is copied from one track into another track (and possibly compacted or re-interleaved with other data, such as audio). This creates larger overall files, but the low bit rate data may be compacted and/or interleaved with other material, for ease of extraction.

b) There may be instructions on how to perform this copy at the time that the file is read.

For the second case, Extractors (defined in A.3) are used.

9.5.3 SHVC Video Stream Definition
9.5.3.1 Sample Entry Name and Format
9.5.3.1.1 Definition Types: 'hvc2', 'hev2', 'shc1', 'shv1', 'shcC'
Container: Sample Description Box ('stsd')
Mandatory: An 'hvc1', 'hev1', 'hvc2', 'hev2', 'shc1', or 'shv1' sample entry is mandatory
Quantity: One or more sample entries may be present When the sample entry name is 'shc1', the default and mandatory value of array_completeness is 1 for arrays of all types of parameter sets, and 0 for all other arrays. When the sample entry name is 'shv1', the default value of array_completeness is 0 for all arrays.

When the sample entry name is 'shv1', the following applies:

If a sample contains at least one IRAP picture as defined in ISO/IEC 23008-2, all parameter sets needed for decoding that sample shall be included either in the sample entry or in that sample itself.

Otherwise (the sample contains no IRAP picture), all parameter sets needed for decoding that sample shall be included either in the sample entry or in any of the samples since the previous sample containing at least one IRAP picture to that sample itself, inclusive.

Alternatively, when the sample entry name is 'shv1', the following applies:

If a coded picture in a sample is an IRAP picture as defined in ISO/IEC 23008-2, all parameter sets needed for decoding that coded picture shall be included either in the sample entry or in that sample itself Otherwise (the coded picture in the sample is not an IRAP picture), all parameter sets needed for decoding that coded picture shall be included either in the sample entry or in any of the samples since the previous sample containing an IRAP picture in the same layer as that coded picture to that sample itself, inclusive.

If an SHVC elementary stream contains a usable HEVC compatible base layer, then an HEVC visual sample entry ('hvc1' or 'hev1') shall be used. Here, the entry shall contain initially an HEVC Configuration Box, possibly followed by an SHVC Configuration Box as defined below. The HEVC Configuration Box documents the Profile, Tier, Level, and possibly also parameter sets pertaining to the HEVC compatible base layer as defined by the HEVCDecoderConfigurationRecord. The SHVC Configuration Box documents the Profile, Tier, Level, and possibly also parameter sets pertaining to the entire stream containing the SHVC compatible enhancement layers as defined by the HEVCDecoderConfigurationRecord, stored in the SHVCConfigurationBox.

If the SHVC elementary stream does not contain a usable HEVC base layer, then an SHVC visual sample entry ('shc1' or 'shv1') shall be used. The SHVC visual sample entry shall contain an SHVC Configuration Box, as defined below. This includes an SHVCDecoderConfigurationRecord, as defined in this International Standard.

The lengthSizeMinusOne field in the SHVC and HEVC configurations in any given sample entry shall have the same value.

Extractors or aggregators may be used for NAL units with nuh_layer_id greater than 0 in 'hvc1', 'hev1', 'hvc2', 'hev2', 'shc1', or 'shv1' tracks. The 'extra boxes' in an 'hvc2' or 'hev2' sample entry may be an SHVCConfigurationBox or other extension boxes.

NOTE When HEVC compatibility is indicated, it may be necessary to indicate an unrealistic level for the HEVC base layer, to accommodate the bit rate of the entire stream, because all the NAL units are considered as included in the HEVC base layer and hence may be fed to the decoder, which is expected to discard those NAL unit it does not recognize. This case happens when the 'hvc1' or 'hev1' sample entry is used and both HEVC and SHVC configurations are present.

An SHVCConfigurationBox may be present in an 'hvc1' or 'hev1' sample entry. In this case, the HEVCSHVCSampleEntry definition below applies.

The following table shows for a video track all the possible uses of sample entries, configurations and the SHVC tools (excluding timed metadata, which is always used in another track):

TABLE 10

Use of sample entries for HEVC and SHVC tracks

| sample entry name | with configuration records | Meaning |
|---|---|---|
| 'hvc1' or 'hev1' | HEVC Configuration Only | A plain HEVC track without NAL units with nuh_layer_id greater than 0; Extractors and aggregators shall not be present. |
| 'hvc1' or 'hev1' | HEVC and SHVC Configurations | An SHVC track with both NAL units with nuh_layer_id equal to 0 and NAL units with nuh_layer_id greater than 0; Extractors and aggregators may be present; Extractors shall not reference NAL units with nuh_layer_id equal to 0; Aggregators shall not contain but may reference NAL units with nuh_layer_id equal to 0. |
| 'hvc2' or 'hev2' | HEVC Configuration Only | A plain HEVC track without NAL units with nuh_layer_id greater than 0; Extractors may be present and used to reference NAL units; Aggregators may be present to contain and reference NAL units. |
| 'hvc2' or 'hev2' | HEVC and SHVC Configurations | An SHVC track with both NAL units with nuh_layer_id equal to 0 and NAL units with nuh_layer_id greater than 0; Extractors and aggregators may be present; Extractors may reference any NAL units; Aggregators may both contain and reference any NAL units. |
| 'shc1' or 'shv1' | SHVC Configuration | An SHVC track without NAL units with nuh_layer_id equal to 0; Extractors may be present and used to reference NAL units; Aggregators may be present to contain and reference NAL units. |

9.5.3.1.2 Syntax

```
class SHVCConfigurationBox extends Box('shcC') {
    SHVCDecoderConfigurationRecord( ) SHVCConfig;
}
class HEVC2SampleEntry( ) extends VisualSampleEntry ('hev2' or 'hvc2')
{
    HEVCConfigurationBox      hevconfig;
    MPEG4BitRateBox ( );                          // optional
    MPEG4ExtensionDescriptorsBox ( );             // optional
    extra_boxes     boxes;                        // optional
}
```

```
class HEVCSHVCSampleEntry( ) extends HEVCSampleEntry {
    SHVCConfigurationBox      shvcconfig;
}
class HEVC2SHVCSampleEntry( ) extends HEVC2SampleEntry( ) {
    SHVCConfigurationBox      shvcconfig;         // optional
}
// Use this if track is not HEVC compatible
class SHVCSampleEntry( ) extends VisualSampleEntry ('shv1' or 'shc1') {
    SHVCConfigurationBox      shvcconfig;
    MPEG4BitRateBox ( );                          // optional
    MPEG4ExtensionDescriptorsBox ( );             // optional
    extra boxes     boxes;                        // optional
}
```

9.5.3.1.3 Semantics

When the stream to which the sample entry applies contains NAL units with nuh_layer_id greater than 0, Compressorname in the base class VisualSampleEntry indicates the name of the compressor used with the value "\013SHVC Coding" being recommended (\013 is 11, the length of the string "SHVC Coding" in bytes).

9.5.4 SHVC Visual Width and Height

The visual width and height documented in a VisualSampleEntry of a stream containing NAL units with nuh_layer_id greater than 0 is the visual width and height of the HEVC base layer, if the stream is described by a sample entry of type 'hvc1', 'hev1', 'hvc2', 'hev2'; otherwise it is the visual width and height of the decoded pictures of the highest layer by decoding the entire stream.

9.5.5 Sync Sample

An SHVC sample is considered as a sync sample if each coded picture in the access unit is an IRAP picture, as defined in ISO/IEC 23008-2. Sync samples are documented by the sync sample table, and may be additionally documented by the sync sample sample group and the 'rap' sample group.

9.5.5.1 Random Accessible Sample Sample Group 9.5.5.1.1 Definition

Group Types: 'ras'
Container: Sample Group Description Box ('ras')
Mandatory: No
Quantity: Zero or more A random accessible sample sample group identifies samples containing at least one IRAP picture.

9.5.5.1.2 Syntax

```
class RandomAccessibleSampleEntry( ) extends VisualSampleGroupEntry
('ras ') {
    unsigned int(1) reserved = 0;
    unsigned int(1) all_pics_are_IRAP
    unsigned int(6) IRAP_nal_unit_type
    if( !all_pics_are_IRAP ) {
        unsigned int(2) reserved = 0;
        unsigned int(6) num_IRAP_pics;
        for(i=0; i< num_IRAP_pics; i++) {
            unsigned int(2) reserved = 0;
            unsigned int(6) IRAP_pic_layer_id
        }
    }
}
```

9.5.5.1.3 Semantics all_pics_are_IRAP equal to 1 specifies that all coded pictures in each sample of the group are IRAP pictures. When the value is equal 0, the above constraint may or may not apply.

IRAP_nal_unit_type specifies the NAL unit type of the IRAP pictures in each sample of the group. The value of IRAP_nal_unit_type shall be in the range of 16 to 23, inclusive.

num_IRAP_pics specifies the number of IRAP pictures in each sample of the group. IRAP_pic_layer_id specifies the value of the nuh_layer_id of the i-th IRAP picture in each sample of the group.

9.5.6 Sample Groups on Random Access Recovery Points and Random Access Points

For video data described by a sample entry of type 'hvc1', 'hev1', 'hvc2', or 'hev2,' the random access recovery sample group and the random access point sample group identify random access recovery points and random access points, respectively, for both an HEVC decoder, and an SHVC decoder (if any) operating on the entire bitstream. For video data described by a sample entry of type 'shc1' or 'shv1,' the random access recovery sample group identifies random access recovery in the entire SHVC bitstream and the random access point sample group identifies random access points in the entire SHVC bitstream.

An SHVC sample is considered as a random access point if each coded pictures in the access unit is an IRAP picture (with or without RASL pictures) as defined in ISO/IEC 23008-2, and the leading samples in ISO/IEC 14496-2 are samples in which all pictures are RASL pictures as defined in ISO/IEC 23008-2.

9.5.7 Independent Disposable Samples Box

If it is used in a track which is both HEVC and SHVC compatible, then care should be taken that the statements are true no matter what valid subset of the SHVC data (possibly only the HEVC data) is used. The 'unknown' values (value 0 of the fields sample-depends-on, sample-is-depended-on, and sample-has-redundancy) may be needed if the information varies.

9.5.8 Definition of a Sub-Sample for SHVC

This subclause extends the definition of sub-sample of HEVC in 8.4.8.

For the use of the sub-sample information box (8.7.7 of ISO/IEC 14496-12) in an SHVC stream, a sub-sample is defined on the basis of the value of the flags of the sub-sample information box as specified below. The presence of this box is optional; however, if present in a track containing SHVC data, it shall have the semantics defined here.

flags specifies the type of sub-sample information given in this box as follows:

0: NAL-unit-based sub-samples. A sub-sample contains one or more contiguous NAL units.

1: Decoding-unit-based sub-samples. A sub-sample contains exactly one decoding unit.

2: Tile-based sub-samples. A sub-sample either contains one tile and the associated non-VCL NAL units, if any, of the VCL NAL unit(s) containing the tile, or contains one or more non-VCL NAL units.

3: CTU-row-based sub-samples. A sub-sample either contains one CTU row within a slice and the associated non-VCL NAL units, if any, of the VCL NAL unit(s) containing the CTU row or contains one or more non-VCL NAL units. This type of sub-sample information shall not be used when entropy_coding_sync_enabled_flag is equal to 0.

4: Slice-based sub-samples. A sub-sample either contains one slice (where each slice may contain one or more slice segments, each of which is a NAL unit) and the associated non-VCL NAL units, if any, or contains one or more non-VCL NAL units.

5: Picture-based sub-samples. A sub-sample contains one coded picture and the associated non-VCL NAL units.

Other values of flags are reserved.

The subsample_priority field shall be set to a value in accordance with the specification of this field in ISO/IEC 14496-12.

The discardable field shall be set to 1 only if this sample can still be decoded if this sub-sample is discarded (e.g. the sub-sample consists of an SEI NAL unit).

When the first byte of a NAL unit is included in a sub-sample, the preceding length field must also be included in the same sub-sample.

```
if(flags == 0) {
    unsigned int(1) SubLayerRefNalUnitFlag;
    unsigned int(1) RapNalUnitFlag;
```

```
                    unsigned int(1) VclNalUnitFlag;
                    unsigned int(1) DiscardableFlag;
                    unsigned int(1) NoInterLayerPredFlag;
                    unsigned int(6) LayerId;
                    unsigned int(3) TempId;
                    unsigned int(18) reserved = 0;
                }else if(flags == 1)
                    unsigned int(32) reserved = 0;
                else if(flags == 2) {
                    unsigned int(2) vcl_idc;
                    unsigned int(2) reserved = 0;
                    unsigned int(4) log2_min_luma_ctb;
                    unsigned int(12) ctb_x;
                    unsigned int(12) ctb_y;
                } else if(flags == 3 || flags == 4) {
                    unsigned int(2) vcl_idc;
                    unsigned int(30) reserved = 0;
                } esle if(flags == 5) {
                    unsigned int(1) DiscardableFlag;
                    unsigned int(6) VclNalUnitType;
                    unsigned int(6) LayerId;
                    unsigned int(3) TempId;
                    unsigned int(1) NoInterLayerPredFlag;
                    unsigned int(1) SubLayerRefNalUnitFlag;
                    unsigned int(14) reserved = 0;
                }
```

SubLayerRefNalUnitFlag equal to 0 indicates that all NAL units in the sub-sample are VCL NAL units of a sub-layer non-reference picture as specified in ISO/IEC 23008-2. Value 1 indicates that all NAL units in the sub-sample are VCL NAL units of a sub-layer reference picture as specified in ISO/IEC 23008-2.

RapNalUnitFlag equal to 0 indicates that none of the NAL units in the sub-sample has nal_unit_type equal to IDR_W_RADL, IDR_N_LP, CRA_NUT, BLA_W_LP, BLA_W_RADL, BLA_N_LP, RSV_IRAP_VCL22, or RSV_IRAP_VCL23 as specified in ISO/IEC 23008-2. Value 1 indicates that all NAL units in the sub-sample have nal_unit_type equal to IDR_W_RADL, IDR_N_LP, CRA_NUT, BLA_W_LP, BLA_W_RADL, BLA_N_LP, RSV_IRAP_VCL22, or RSV_IRAP_VCL23 as specified in ISO/IEC 23008-2.

VclNalUnitFlag equal to 0 indicates that all NAL units in the sub-sample are non-VCL NAL units. Value 1 indicates that all NAL units in the sub-sample are VCL NAL units.

DiscardableFlag indicates the discardable_flag value of the VCL NAL units in the sub-sample. All the VCL NAL units in the sub-sample shall have the same discardable_flag value.
  NOTE that this is not the same definition as the discardable field in the sub-sample information box.

NoInterLayerPredFlag indicates the value of the inter_layer_pred_enabled_flag of the VCL NAL units in the sub-sample. All the VCL NAL units in the sub-sample shall have the same value of inter_layer_pred_enabled_flag.

LayerId indicates the nuh_layer_id value of the NAL units in the sub-sample. All the NAL units in the sub-sample shall have the same nuh_layer_id value.

TempId indicates the TemporalId value of the NAL units in the sub-sample. All the NAL units in the sub-sample shall have the same TemporalId value.

vcl_idc indicates whether the sub-sample contains Video Coding Layer (VCL) data, non-VCL data, or both, as follows:
    0: the sub-sample contains VCL data and does not contain non-VCL data
    1: the sub-sample contains no VCL data and contains non-VCL data
    2: the sub-sample may contain both VCL and non-VCL data, which shall be associated with each other. For example, a sub-sample may contain a decoding unit information SEI message followed by the set of NAL units associated with the SEI message.
    3: reserved log2_min_luma_ctb indicates the unit of ctb_x and ctb_y, specified as follows:
    0: 8 luma samples
    1: 16 luma samples
    2: 32 luma samples
    3: 64 luma samples ctb_x specifies the 0-based coordinate of the right-most luma samples of the tile associated with the sub-sample when flags is equal to 2 and vcl_idc is equal to 1 or 2, in units derived from log2_min_luma_ctb as specified above.

ctb_y specifies the 0-based coordinate the bottom-most luma samples of the tile associated with the sub-sample when flags is equal to 2 and vcl_idc is equal to 1 or 2, in units derived from log2_min_luma_ctb as specified above.

VclNalUnitType indicates the nal_unit_type value of the VCL NAL units in the sub-sample. All the VCL NAL units in the sub-sample shall have the same nal_unit_type value.

9.5.9 Handling Non-Output Samples

The specification in 8.4.9 applies with "HEVC" being replaced with "SHVC," and a non-output sample is defined as a sample in which the picture(s) of the target output layers have pic_output_flag equal to 0. When an access unit contains some coded pictures that have pic_output_flag equal to 1 and some other coded pictures that have pic_output_flag equal to 0, at least two tracks must be used to store the stream, such that within each track all coded pictures in each sample have the same value of pic_output_flag.

10 10 MV-HEVC Elementary Stream and Sample Definitions 10.1 Introduction

This clause specifies the storage format of MV-HEVC data. It extends the definitions of the storage format of HEVC in clause 8.

The file format for storage of MV-HEVC content, as defined in this clause and Annexes A to D uses the existing capabilities of the ISO base media file format and the plain HEVC file format (i.e. the file format specified in clause 8). In addition, the following structures or extensions, among others, to support MV-HEVC-specific features are used.

Aggregator:
  a structure to enable efficient scalable grouping of NAL units by changing irregular patterns of NAL units into regular patterns of aggregated data units.

Extractor:
  a structure to enable efficient extraction of NAL units from other tracks than the one containing the media data.

HEVC compatibility:
  a provision for storing an MV-HEVC bitstream in an HEVC compatible manner, such that the HEVC compatible base layer can be used by any plain HEVC file format compliant reader.

The support for MV-HEVC includes a number of tools, and there are various 'models' of how they might be used. In particular, an MV-HEVC stream can be placed in tracks in a number of ways, among which are the following:

1. all the views in one track, labelled with sample groups;
2. each view in its own track, labelled in the sample entries;
3. a hybrid, one track containing all views, and one or more single-view tracks each containing a view that can be independently coded;
4. the expected operating points each in a track (e.g. the HEVC base, a stereo pair, a multiview scene).

The MV-HEVC file format allows storage of one or more views into a track, similarly to the support for SHVC in clause 9. Storage of multiple views per track can be used, e.g., when a content provider wants to provide a multiview bitstream that is not intended for subsetting or when the bitstream has been created for a few pre-defined sets of output views (such as 1, 2, 5, or 9 views) where tracks can be created accordingly. If more than one view is stored in a track and there are several tracks (more than one) representing the MV-HEVC bitstream, the use of the sample grouping mechanism is recommended.

When an MV-HEVC bitstream is represented by multiple tracks and a player uses an operating point that contains data in multiple tracks, the player must reconstruct MV-HEVC access units before passing them to the MV-HEVC decoder.

An MV-HEVC operating point may be explicitly represented by a track, i.e., an access unit is reconstructed simply by resolving all extractor and aggregator NAL units of a sample. If the number of operating points is large, it may be space-consuming and impractical to create a track for each operating point. In such a case, MV-HEVC access units are reconstructed as specified in 10.5.2. The MV-HEVC Decoder Configuration record contains a field indicating whether the associated samples use explicit or implicit access unit reconstruction (see the explicit_au_track field).

10.2 MV-HEVC Track Structure

MV-HEVC streams are stored in accordance with 8.2, with the following definition of an MV-HEVC video elementary stream:

MV-HEVC video elementary streams shall contain all video coding related
  NAL units (i.e. those NAL units containing video data or signalling video structure) and may contain non-video coding related NAL units such as SEI messages and access unit delimiter NAL units. Also Aggregators (see A.2) or Extractors (see A.3) may be present. Aggregators and Extractors shall be processed as defined in this International Standard (e.g. shall not directly be placed in the output buffer while accessing the file). Other NAL units that are not expressly prohibited may be present, and if they are unrecognized they should be ignored (e.g. not placed in the output buffer while accessing the file).

MV-HEVC streams shall not be stored using associated parameter set streams, when needed.

There may be VCL NAL units with nuh_layer_id equal to 0, VCL NAL units with nuh_layer_id greater than 0, and other non-VCL NAL units, present in an MV-HEVC video elementary stream. Additionally, there may be Aggregator or Extractor NAL units present in an MV-HEVC video elementary stream.

10.3 Use of the Plain HEVC File Format

The MV-HEVC file format is an extension of the plain HEVC file format defined in clause 8.

10.4 Sample and Configuration Definition 10.4.1 Introduction

MV-HEVC Sample: An MV-HEVC sample is also an access unit as defined in Annex F of ISO/IEC 23008-2.

10.4.2 Canonical Order and Restriction 10.4.2.1 Restrictions

The following restrictions apply to MV-HEVC data in addition to the requirements in clause 8.3.2.

VCL NAL units: All VCL NAL units in one access unit shall be contained in the sample whose composition time is that of the picture represented by the access unit. An MV-HEVC sample shall contain at least one VCL NAL unit.

Aggregators/Extractors: The order of all NAL units included in an Aggregator or referenced by an Extractor is exactly the decoding order as if these NAL units were present in a sample not containing Aggregators/Extractors. After processing the Aggregator or the Extractor, all NAL units must be in valid decoding order as specified in ISO/IEC 23008-2.

10.4.2.2 Decoder Configuration Record

When the decoder configuration record defined in clause 8.3.3.1 is used for a stream that can be interpreted as either an MV-HEVC or HEVC stream, the HEVC decoder configuration record shall reflect the properties of the HEVC compatible base view, e.g. it shall contain only parameter sets needed for decoding the HEVC base view.

The MVHEVCDecoderConfigurationRecord is structurally identical to an HEVCDecoderConfigurationRecord. The syntax is as follows:

```
aligned(8) class MVHEVCDecoderConfigurationRecord {
    // same fields as in HEVCDecoderConfigurationRecord syntax structure
}
```

The semantics of the fields in MVHEVCDecoderConfigurationRecord are the same as defined for an HEVCDecoderConfigurationRecord.

10.4.3 Sync Sample

An MV-HEVC sample is considered as a sync sample if each coded pictures in the access unit is an IRAP picture without RASL pictures, as defined in ISO/IEC 23008-2. Sync samples are documented by the sync sample table, and may be additionally documented by the sync sample sample group and the 'rap' sample group defined similar as in SHVC.

10.4.4 Independent and Disposable Samples Box

If it is used in a track which is both HEVC and MV-HEVC compatible, then care should be taken that the statements are true no matter what valid subset of the MV-HEVC data (possibly only the HEVC data) is used. The 'unknown' values (value 0 of the fields sample-depends-on, sample-is-depended-on, and sample-has-redundancy) may be needed if the information varies.

10.4.5 Sample Groups on Random Access Recovery Points and Random Access Points

For video data described by a sample entry of type 'hvc1', 'hev1', 'hvc2', or 'hev2', the random access recovery sample group and the random access point sample group identify random access recovery points and random access points, respectively, for both an HEVC decoder, and an MV-HEVC decoder (if any) operating on the entire bitstream.

For video data described by an MV-HEVC sample entry type, the random access recovery sample group identifies random access recovery in the entire MV-HEVC bitstream and the random access point sample group identifies random access points in the entire MV-HEVC bitstream.

10.5 Derivation from the ISO Base Media File Format 10.5.1 MV-HEVC Track Structure A multi-view video stream is represented by one or more video tracks in a file. Each track represents one or more views of the stream.

There is a minimal set of one or more tracks that, when taken together, contain the complete set of encoded information. All these tracks shall have the flag "complete_representation" set in all their sample entries. This group of tracks that form the complete encoded information are called the "complete subset".

Let the lowest operating point be the one of all the operating points that contains NAL units with nuh_layer_id equal to 0 only and TemporalId equal to 0 only. A track that contains the lowest operating point shall be nominated as the 'base view track'. All the other tracks that are part of the same stream shall be linked to this base track by means of a track reference of type 'sbas' (view base).

All the tracks sharing the same base view track must share the same timescale as the base view track.

If a view represented by a track uses another view represented by another track as an inter-view prediction reference, a track reference of type 'scal' shall be included in the track referring to the source track for inter-view prediction.

If edits are applied to tracks that contain view components of an MV-HEVC bitstream, edit lists shall be consistent over all tracks affected by the edits.

10.5.2 RECONSTRUCTION OF AN ACCESS UNIT

In order to reconstruct an access unit from samples of one or more MV-HEVC tracks, the target output views may need to be determined first.

The views that are required for decoding the determined target output views can be concluded from reference view identifiers included in the View Identifier box or the 'scal' track references.

If several tracks contain data for the access unit, the alignment of respective samples in tracks is performed on decoding time, i.e. using the time-to-sample table only without considering edit lists.

An access unit is reconstructed from the respective samples in the required tracks by arranging their NAL units in an order conforming to ISO/IEC 23008-02. The following order provides an outline of the procedure to form a conforming access unit:

- All parameter set NAL units (from the associated parameter set tracks and from the associated elementary stream tracks).
- All SEI NAL units (from the associated parameter set tracks and from the associated elementary stream tracks).
- View components in ascending order of view order index value. NAL units within a view component are in their appearance order within the sample.

10.5.3 Sample Entry 10.5.3.1 Boxes for Sample Entry 10.5.3.1.1 View Identifier Box 10.5.3.1.1.1 Definition Box Type: 'vwid'

Container: Sample Entry ('hev1', 'hvc1', 'hev2', 'hvc2', 'mhc1', 'mhv1') or MultiviewGroupEntry Mandatory: Yes (for sample entries)

Quantity: Exactly one (for sample entries)

When included in a sample entry, this box indicates the views included in the track. This box also indicates the view order index for each listed view. Additionally, the box includes the minimum and maximum values of temporal_id included in the track when the View Identifier box is included in a sample entry. Moreover, the box indicates the referenced views required for decoding the views included in the track.

10.5.3.1.1.2 Syntax

```
class ViewIdentifierBox extends FullBox ('vwid', version=0, flags)
{
    unsigned int(2) reserved6 = 0;
    unsigned int(3) min_temporal_id;
    unsigned int(3) max_temporal_id;
    unsigned int(16)  num_views;
    for (i=0; i<num views; i++) {
        unsigned int(6) reserved1 = 0;
        unsigned int(6) layer_id[i];
        unsigned int(10) view_id[i];
        unsigned int(2)       base_view_type;
        for (j = 0; j < layer_id[i]; j++) {
            unsigned int(1)        depdent_layer[i][j];
        }
    }
}
```

10.5.3.1.1.3 Semantics min_temporal_id, max_temporal_id take the minimum and maximum value, respectively, of the temporal_id syntax element that is present in the NAL unit header extension of the NAL units mapped to the track or tier when the View Identifier box is included in a sample entry, respectively. For AVC streams this takes the value that is, or would be, in the prefix NAL unit.

num_views, when the View Identifier box is present in a sample entry, indicates the number of views included in the track.

layer_id[i] indicates the value of the nuh_layer_id syntax element in the NAL unit header of a layer included in the track when the View Identifier box is included in a sample entry.

view_id indicates the view identifier of the i-th layer with nuh_layer_id equal to layer_id[i], as specified in Annex F of ISO/IEC 23008-2.

base_view_type indicates whether the view is a base view (virtual or not). It takes the following values:

0 indicates that the view is neither a base view nor virtual base view.

1 shall be used to label the non-virtual base view of the MV-HEVC bitstream.

2 is a reserved value and shall not be used.

3 indicates that the view with view_id[i] is a virtual base view. The respective independently coded non-base view with view_id[i] resides in another track. When base_view_type is equal to 3, the subsequent num_ref_views shall be equal to 0.

depdent_layer[i][j] indicates the whether the j-th layer with nuh_layer_id equal to j may be a directly or indirectly referenced layer of the layer with nuh_layer_id equal to layer_id[i]. When the View Identifier box is included in a sample entry, it is recommended to indicate the referenced views in the same sample entry.

10.5.3.2 Sample Entry Definition

Sample Entry Types: 'hvc2', 'hev2', 'mhc1', 'mhv1', 'mhcC',

Container: Sample Description Box ('stsd')

Mandatory: One of the 'hvc1', 'hev1', 'hvc2', 'hev2', 'mhc1', or 'mhv1' boxes is mandatory Quantity: One or more sample entries may be present If an MV-HEVC elementary stream contains a usable HEVC compatible base view, then an HEVC visual sample entry ('hvc1', 'hev1', 'hvc2', 'hev2') shall be used. Here, the entry shall contain initially an HEVC Configuration Box, possibly followed by an MV-HEVC Configuration Box as defined below. The HEVC Configuration Box documents the Profile, Level, and possibly also parameter sets pertaining to the HEVC compatible base view as defined by the HEVCDecoderConfigurationRecord. The MV-HEVC Configuration Box documents the Profile, Level and Parameter Set information pertaining to the entire stream containing the non-base views as defined by the MVHEVCDecoderConfigurationRecord, stored in the MVHEVCConfigurationBox.

For all sample entries 'hvc1,' 'hev1,' 'hvc2,' 'hev2,' the width and height fields in the sample entry document the HEVC base layer. For an MV-HEVC sample entry ('mhc1', 'mhv1'), the width and height document the resolution achieved by decoding any single view of the entire stream.

If the MV-HEVC elementary stream does not contain a usable HEVC base view, then an MV-HEVC visual sample entry ('mhc1', 'mhv1') shall be used. The MV-HEVC visual sample entry shall contain an MV-HEVC Configuration Box, as defined below. This includes an MVHEVCDecoderConfigurationRecord, as defined in this International Standard.

The lengthSizeMinusOne field in the MV-HEVC and HEVC configurations in any given sample entry shall have the same value.

The requirements for the sample entry types 'hvc1' and 'hev1' as documented in 6.5.3.1.1 also apply here.

The MVHEVCConfigurationBox may be present in an 'hvc1', 'hev1', 'hvc2', 'hev2' sample entry. In these cases, the HEVCMVHEVCSampleEntry or HEVC2MVHEVCSampleEntry definition below applies, respectively.

Compressorname in the base class VisualSampleEntry indicates the name of the compressor used, with the value "\014MV-HEVC Coding" being recommended (\016 is 14, the length of the string "MV-HEVC coding" in bytes).

The parameter sets required to decode a NAL unit that is present in the sample data of a video stream, either directly or by reference from an Extractor, shall be present in the decoder configuration of that video stream or in the associated parameter set stream (if used).

The following table shows for a video track all the possible uses of sample entries when an MV-HEVC elementary stream is stored in one or more tracks, configurations, and the MV-HEVC tools.

TABLE 14

Use of sample entries for HEVC and MV-HEVC tracks

| sample entry name | with configuration records | Meaning |
|---|---|---|
| 'hvc1' or 'hev1' | HEVC Configuration Only | A plain HEVC track without NAL units with nuh_layer_id greater than 0; Extractors and aggregators shall not be present. |
| 'hvc1' or 'hev1' | HEVC and MV-HEVC Configurations | An MV-HEVC track with both NAL units with nuh_layer_id equal to 0 and NAL units with nuh_layer_id greater than 0; Extractors and aggregators may be present; Extractors shall not reference NAL units with nuh_layer_id equal to 0; Aggregators shall not contain but may reference NAL units with nuh_layer_id equal to 0. |
| 'hvc2' or 'hev2' | HEVC Configuration Only | A plain HEVC track without NAL units with nuh_layer_id greater than 0; Extractors may be present and used to reference NAL units; Aggregators may be present to contain and reference NAL units. |
| 'hvc2' or 'hev2' | HEVC and MV-HEVC Configurations | An MV-HEVC track with both NAL units with nuh_layer_id equal to 0 and NAL units with nuh_layer_id greater than 0; Extractors and aggregators may be present; Extractors may reference any NAL units; Aggregators may both contain and reference any NAL units. |
| 'mhc1' or 'mhv1' | MV-HEVC Configuration | An MV-HEVC track without NAL units with nuh_layer_id equal to 0; Extractors may be present and used to reference NAL units; Aggregators may be present to contain and reference NAL units. |

The sample entry mvhevc-type in the following is one of {mhv1, mhc1}.

10.5.3.3 Syntax

```
class MVHEVCConfigurationBox extends Box('mhcC') {
    MVHEVCDecoderConfigurationRecord( ) MVHEVCConfig;
}
class HEVCMVHEVCSampleEntry( ) extends HEVCSampleEntry( ) {
    ViewIdentifierBox        view_identifiers;   // optional
    MVHEVCConfigurationBox   mvhevcconfig;       // optional
}
class HEVC2MVHEVCSampleEntry( ) extends HEVC2SampleEntry( ) {
    ViewIdentifierBox        view_identifiers;   // optional
    MVHEVCConfigurationBox   mvhevcconfig;       // optional
}
// Use this if the track is NOT HEVC compatible
class MVHEVCSampleEntry( ) extends VisualSampleEntry(mvhevc-type)
{
    MVHEVCConfigurationBox   mvhevcconfig;       //
                                                 mandatory
    ViewIdentifierBox   view_identifiers;        //
                                                 mandatory
    MPEG4BitRateBox bitrate;                     // optional
    MPEG4ExtensionDescriptorsBox descr;          // optional
}
```

10.5.4 Definition of a Sub-Sample for MV-HEVC

The definition of sub-sample for MV-HEVC is defined similar to that defined for SHVC.

10.5.5 Handling Non-Output Samples

Handling of non-output samples for MV-HEVC is defined similar to that defined for SHVC.

Changes to Annex A are shown below.

Annex A (Normative)

In-Stream Structures

A.1 Introduction

Aggregators and Extractors are file format internal structures enabling efficient grouping of NAL units or extraction of NAL units from other tracks.

Aggregators and Extractors use the NAL unit syntax. These structures are seen as NAL units in the context of the sample structure. While accessing a sample, Aggregators must be removed (leaving their contained or referenced NAL units) and Extractors must be replaced by the data they reference. Aggregators and Extractors must not be present in a stream outside the file format.

These structures use NAL unit types reserved for the application/transport layer by ISO/IEC 14496-10 or ISO/IEC 23008-2.

NOTE The following is from ISO/IEC 14496-10:

"NOTE—NAL unit types 0 and 24 . . . 31 may be used as determined by the application. No decoding process for these values of nal_unit_type is specified in this Recommendation|International Standard."

NOTE The following is from ISO/IEC 23008-2:

"NOTE1—NAL unit types in the range of UNSPEC48 . . . UNSPEC63 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values."

A.2 Aggregators

A.2.1 Definition

This subclause describes Aggregators, which enable NALU-map-group entries to be consistent and repetitive. (See Annex B).

Aggregators are used to group NAL units belonging to the same sample.

For storage of ISO/IEC 14496-10 video, the following rules apply:

Aggregators use the same NAL unit header as SVC VCL NAL units or MVC VCL NAL units, but with a different value of NAL unit type.

When the svc_extension_flag of the NAL unit syntax (specified in 7.3.1 of ISO/IEC 14496-10) of an aggregator is equal to 1, the NAL unit header of SVC VCL NAL units is used for the aggregator. Otherwise, the NAL unit header of MVC VCL NAL units is used for the aggregator.

For storage of ISO/IEC 23008-2 video, Aggregators use the NAL unit header as defined in ISO/IEC 23008-2, which has the same syntax for plain HEVC, SHVC, and MV-HEVC.

Aggregators can both aggregate, by inclusion, NAL units within them (within the size indicated by their length) and also aggregate, by reference, NAL units that follow them (within the area indicated by the additional_bytes field within them). When the stream is scanned by an AVC or HEVC file reader, only the included NAL units are seen as "within" the aggregator. This permits an AVC or HEVC file reader to skip a whole set of un-needed NAL units when they are aggregated by inclusion. This also permits an AVC or HEVC reader not to skip needed NAL units but let them remain in-stream when they are aggregated by reference.

Aggregators can be used to group base layer or base view NAL units. If these Aggregators are used in an 'avc1', 'hvc1', or 'hev1' track then an aggregator shall not use inclusion but reference of base layer or base view NAL units (the length of the Aggregator includes only its header and the NAL units referenced by the Aggregator are specified by additional_bytes).

When the aggregator is referenced by either an extractor with data_length equal to zero, or by a Map sample group, the aggregator is treated as aggregating both the included and referenced bytes.

An Aggregator may include or reference Extractors. An Extractor may extract from Aggregators. An aggregator must not include or reference another aggregator directly; however, an aggregator may include or reference an extractor which references an aggregator.

When scanning the stream:

a) if the aggregator is unrecognized (e.g. by an AVC or HEVC reader or decoder) it is easily discarded with its included content;

b) if the aggregator is not needed (i.e. it belongs to an undesired layer) it and its contents both by inclusion and reference are easily discarded (using its length and additional_bytes fields);

c) if the aggregator is needed, its header is easily discarded and its contents retained.

An aggregator is stored within a sample like any other NAL unit.

All NAL units remain in decoding order within an aggregator.

A.2.2 Syntax

```
class aligned(8) Aggregator (AggregatorSize) {
    NALUnitHeader( );
    unsigned int i = sizeof(NALUnitHeader( ));
    unsigned int((lengthSizeMinusOne+1)*8)
        additional_bytes;
    i += lengthSizeMinusOne+1;
    while (i<AggregatorSize) {
        unsigned int((lengthSizeMinusOne+1)*8)
            NALUnitLength;
        unsigned int(NALUnitLength*8) NALUnit;
        i += NALUnitLength+lengthSizeMinusOne+1;
    };
}
```

A.2.3 Semantics

The value of the variable AggregatorSize is equal to the size of the aggregator NAL unit, and the function sizeof(X) returns the size of the field X in bytes.

NALUnitHeader( ): the first four bytes of SVC and MVC VCL NAL units, or the first two bytes of ISO/IEC 23008-2 NAL units.

nal_unit_type shall be set to the aggregator NAL unit type (type 30 for ISO/IEC 14496-10 video and type 48 for ISO/IEC 23008-2 video).

For an aggregator including or referencing SVC NAL units, the following shall apply.

forbidden_zero_bit and reserved_three_2bits shall be set as specified in ISO/IEC 14496-10.

Other fields (nal_ref_idc, idr_flag, priority_id, no_inter_layer_pred_flag, dependency_id, quality_id, temporal_id, use_ref_base_pic_flag, discardable_flag, and output_flag) shall be set as specified in A.4.

For an aggregator including or referencing MVC NAL units, the following shall apply.

forbidden_zero_bit and reserved_one_bit shall be set as specified in ISO/IEC 14496-10.

Other fields (nal_ref_idc, non_idr_flag, priority_id, view_id, temporal_id, anchor_pic_flag, and inter_view_flag) shall be set as specified in A.5.

For an aggregator including or referencing ISO/IEC 23008-2 NAL units, the following shall apply.

forbidden_zero_bit shall be set as specified in ISO/IEC 23008-2.

Other fields (nuh_layer_id and nuh_temporal_id_plus1) shall be set as specified in A.6.

additional_bytes: The number of bytes following this aggregator NAL unit that should be considered as aggregated when this aggregator is referenced by an extractor with data_length equal to zero or Map sample group.

NALUnitLength: Specifies the size, in bytes, of the NAL unit following. The size of this field is specified with the lengthSizeMinusOne field.

NALUnit: a NAL unit as specified in ISO/IEC 14496-10 or ISO/IEC 23008-2, including the NAL unit header. The size of the NAL unit is specified by NALUnitLength.

A.3 Extractors

A.3.1 Definition

This subclause describes Extractors, which enable compact formation of tracks that extract, by reference, NAL unit data from other tracks.

An Aggregator may include or reference Extractors. An Extractor may reference Aggregators. When an extractor is processed by a file reader that requires it, the extractor is logically replaced by the bytes it references. Those bytes must not contain extractors; an extractor must not reference, directly or indirectly, another extractor.

NOTE The track that is referenced may contain extractors even though the data that is referenced by the extractor must not.

An extractor contains an instruction to extract data from another track, which is linked to the track in which the extractor resides, by means of a track reference of type 'scal'. The bytes copied shall be one of the following:

a) One entire NAL unit; note that when an Aggregator is referenced, both the included and referenced bytes are copied b) More than one entire NAL unit In both cases the bytes extracted start with a valid length field and a NAL unit header.

The bytes are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. (However, one would normally expect that the edit lists in the two tracks would be identical).

A.3.2 Syntax

```
class aligned(8) Extractor ( ) {
    NALUnitHeader( );
    unsigned int(8) track_ref_index;
    signed int(8) sample_offset;
    unsigned int((lengthSizeMinusOne+1)*8)
        data_offset;
    unsigned int((lengthSizeMinusOne+1)*8)
        data_length;
}
```

A.3.3 Semantics

NALUnitHeader( ): the first four bytes of SVC and MVC VCL NAL units, or the first two bytes of ISO/IEC 23008-2 NAL units.

nal_unit_type shall be set to the extractor NAL unit type (type 31 for ISO/IEC 14496-10 video and type 49 for ISO/IEC 23008-2 video).

For an extractor referencing SVC NAL units, the following shall apply.

forbidden_zero_bit and reserved_three_2bits shall be set as specified in ISO/IEC 14496-10.

Other fields (nal_ref_idc, idr_flag, priority_id, no_inter_layer_pred_flag, dependency_id, quality_id, temporal_id, use_ref_base_pic_flag, discardable_flag, and output_flag) shall be set as specified in A.4.

For an extractor referencing MVC NAL units, the following shall apply.

forbidden_zero_bit and reserved_one_bit shall be set as specified in ISO/IEC 14496-10.

Other fields (nal_ref_idc, non_idr_flag, priority_id, view_id, temporal_id, anchor_pic_flag, and inter_view_flag) shall be set as specified in A.5.

For an extractor referencing ISO/IEC 23008-2 NAL units, the following shall apply.

forbidden_zero_bit shall be set as specified in ISO/IEC 23008-2.

Other fields (nuh_layer_id and nuh_temporal_id_plus1) shall be set as specified in A.6.

track_ref_index specifies the index of the track reference of type 'scal' to use to find the track from which to extract data. The sample in that track from which data is extracted is temporally aligned or nearest preceding in the media decoding timeline, i.e. using the time-to-sample table only, adjusted by an offset specified by sample_offset with the sample containing the Extractor. The first track reference has the index value 1; the value 0 is reserved.

sample_offset gives the relative index of the sample in the linked track that shall be used as the source of information. Sample 0 (zero) is the sample with the same, or the closest preceding, decoding time compared to the decoding time of the sample containing the extractor; sample 1 (one) is the next sample, sample −1 (minus 1) is the previous sample, and so on.

data_offset: The offset of the first byte within the reference sample to copy. If the extraction starts with the first byte of data in that sample, the offset takes the value 0. The offset shall reference the beginning of a NAL unit length field.

data_length: The number of bytes to copy. If this field takes the value 0, then the entire single referenced NAL unit is copied (i.e. the length to copy is taken from the length field referenced by the data offset, augmented by the additional_bytes field in the case of Aggregators).

NOTE If the two tracks use different lengthSizeMinusOne values, then the extracted data will need re-formatting to conform to the destination track's length field size.

A.4 NAL Unit Header Values for SVC

Both extractors and aggregators use the NAL unit header SVC extension. The NAL units extracted by an extractor or aggregated by an aggregator are all those NAL units that are referenced or included by recursively inspecting the contents of aggregator or extractor NAL units.

The fields nal_ref_idc, idr_flag, priority_id, temporal_id, dependency_id, quality_id, discardable_flag, output_flag, use_ref_base_pic_flag, and no_inter_layer_pred_flag shall take the following values:

nal_ref_idc shall be set to the highest value of the field in all the extracted or aggregated NAL units.

idr_flag shall be set to the highest value of the field in all the extracted or aggregated NAL units.

priority_id, temporal_id, dependency_id, and quality_id shall be set to the lowest values of the fields, respectively, in all the extracted or aggregated NAL units.

discardable_flag shall be set to 1 if and only if all the extracted or aggregated NAL units have the discardable_flag set to 1, and set to 0 otherwise.

output_flag should be set to 1 if at least one of the aggregated or extracted NAL units has this flag set to 1, and otherwise set to 0.

use_ref_base_pic_flag shall be set to 1 if and only if at least one of the extracted or aggregated VCL NAL units have the use_ref_base_pic_flag set to 1, and set to 0 otherwise.

no_inter_layer_pred_flag shall be set to 1 if and only if all the extracted or aggregated VCL NAL units have the no_inter_layer_pred_flag set to 1, and set to 0 otherwise.

If the set of extracted or aggregated NAL units is empty, then each of these fields takes a value conformant with the mapped tier description.

NOTE Aggregators could group NAL units with different scalability information.

NOTE Aggregators could be used to group NAL units belonging to a level of scalability which may not be signalled by the NAL unit header (e.g. NAL units belonging to a region of interest). The description of such Aggregators may be done with the tier description and the NAL unit map groups. In this case, more than one Aggregator with the same scalability information may occur in one sample.

NOTE If multiple scalable tracks reference the same media data, then an aggregator should group NAL units with identical scalability information only. This ensures that the resulting pattern can be accessed by each of the tracks.

NOTE If no NAL unit of a particular layer exists in an access unit then an empty Aggregator (in which the length of the Aggregator includes only the header, and additional_bytes is zero) may exist.

A.5 NAL Unit Header Values for MVC

Both Aggregators and Extractors use the NAL unit header MVC extension. The NAL units extracted by an extractor or aggregated by an aggregator are all those NAL units that are referenced or included by recursively inspecting the contents of aggregator or extractor NAL units.

The fields nal_ref_idc, non_idr_flag, priority_id, view_id, temporal_id, anchor_pic_flag, and inter_view_flag shall take the following values:

nal_ref_idc shall be set to the highest value of the field in all the aggregated or extracted NAL units.

non_idr_flag shall be set to the lowest value of the field in all the aggregated or extracted NAL units.

priority_id and temporal_id shall be set to the lowest values of the fields, respectively, in all the aggregated or extracted NAL units.

view_id shall be set to the view_id value of the VCL NAL unit with the lowest view order index among all the aggregated or extracted VCL NAL units.

anchor_pic_flag and inter_view_flag shall be set to the highest value of the fields, respectively, in all the aggregated or extracted VCL NAL units.

If the set of extracted or aggregated NAL units is empty, then each of these fields takes a value conformant with the mapped tier description.

A.6 NAL Unit Header Values for ISO/IEC 23008-2

Both Aggregators and Extractors use the NAL unit header as specified in ISO/IEC 23008-2. The NAL units extracted by an extractor or aggregated by an aggregator are all those NAL units that are referenced or included by recursively inspecting the contents of aggregator or extractor NAL units. The fields nuh_layer_id and nuh_temporal_id_plus1 shall be set as follows:

nuh_layer_id shall be set to the lowest value of the field in all the aggregated or extracted NAL units.

nuh_temporal_id_plus1 shall be set to the lowest value of the field in all the aggregated or extracted NAL units.

In one alternative example, a new structure, table, or sample group is defined to document all IRAP access units as defined in Annex F of MV-HEVC WD5 or SHVC WD3. Alternatively, the new structure, table, or sample group is defined to document all IRAP access units as defined in Annex F of MV-HEVC WD5 or SHVC WD3 but excluding those access units where all coded pictures are IRAP pictures. In another alternative example, the sync sample sample group entry SyncSampleEntry is redefined to include an aligned_sync_flag in one of the reserved bits that specifies that all the picture in the sample that belong to this group are IDR pictures, CRA pictures or BLA pictures. In another alternative example, a common file format for SHVC and MV-HEVC is defined including all the common aspects from the SHVC and MV-HEVC file formats, and only the SHVC and MV-HEVC file formats are redefined to only include the aspects only related to that extension. In another alternative example, an SHVC metadata sample entry SHVCMetadataSampleEntry and SHVCMetadataSampleConfigBox are defined, and a metadata sample statement type scalabilityInfoSHVCStatement is also defined.

Figure 2:
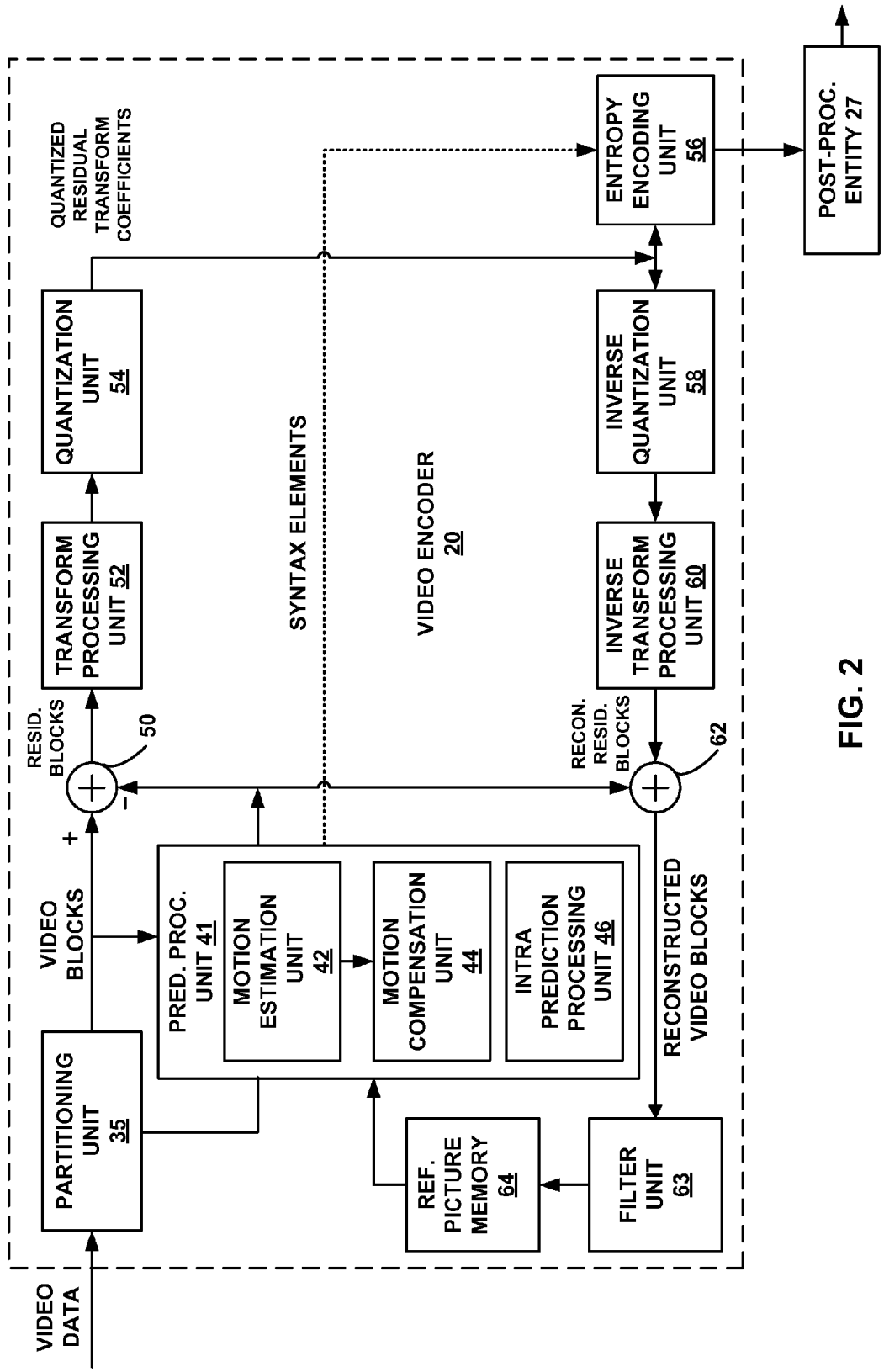
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may be configured to output single view, multiview, scalable, 3D, and other types of video data. Video encoder 20 may be configured to output video to post-processing processing entity 27. Post-processing processing entity 27 is intended to represent an example of a video entity, such as a MANE or splicing/editing device, that may process encoded video data from video encoder 20. In some instances, post-processing processing entity may be an example of a network entity. In some video encoding systems, post-processing entity 27 and video encoder 20 may be parts of separate devices, while in other instances, the functionality described with respect to post-processing entity 27 may be performed by the same device that comprises video encoder 20. Post-processing entity 27 may be a video device. In some examples, post-processing entity 27 may be the same as file generation device 34 of FIG. 1.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, filter unit 63, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

A video data memory of video encoder 20 may store video data to be encoded by the components of video encoder 20. The video data stored in the video data memory may be obtained, for example, from video source 18. Reference picture memory 64 may be a reference picture memory that stores reference video data for use in encoding video data by video encoder 20, e.g., in intra- or inter-coding modes. The video data memory and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. The video data memory and reference picture memory 64 may be provided by the same memory device or separate memory devices. In various examples, the video data memory may be on-chip with other components of video encoder 20, or off-chip relative to those components.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 may form a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes. For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 may form a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 may entropy encode syntax elements representing the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Video encoder 20 represents an example of a video coder configured generate video data that may be stored using the file format techniques described in this disclosure.

Figure 3:
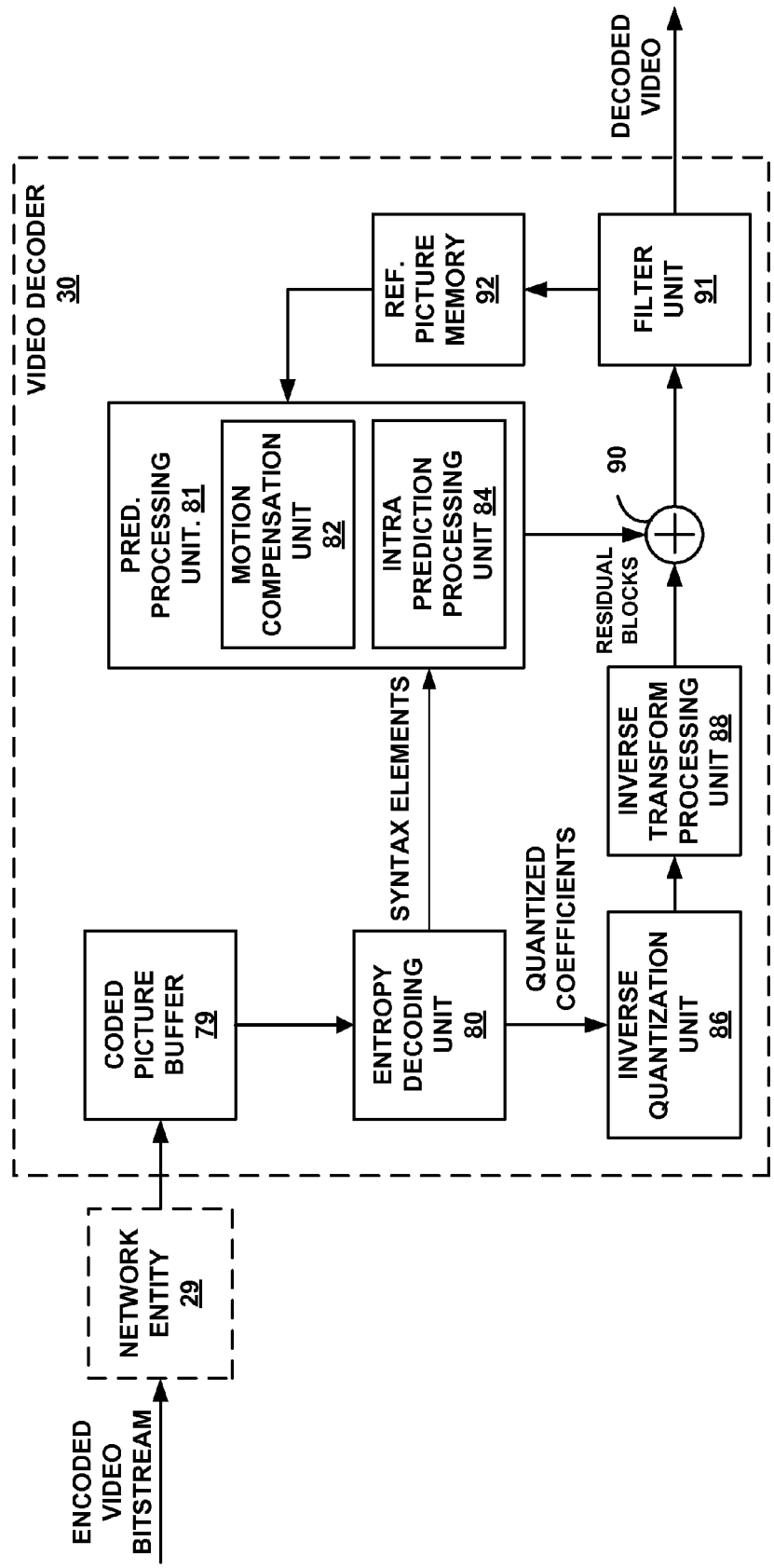
FIG. 3 is a block diagram illustrating an example video decoder that may implement the techniques described in this disclosure.

FIG. 3 is a block diagram illustrating an example video decoder 30 that may implement the techniques described in this disclosure. Video decoder 30 may be configured to decode single view, multiview, scalable, 3D, and other types of video data. In the example of FIG. 3, video decoder 30 includes an entropy decoding unit 80, prediction processing unit 81, inverse quantization unit 86, inverse transform processing unit 88, summer 90, filter unit 91, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

A coded picture buffer (CPB) 79 may receive and store encoded video data (e.g., NAL units) of a bitstream. The video data stored in CPB 79 may be obtained, for example, from link 16, e.g., from a local video source, such as a camera, via wired or wireless network communication of video data, or by accessing physical data storage media. CPB 79 may form a video data memory that stores encoded video data from an encoded video bitstream. CPB 79 may be a reference picture memory that stores reference video data for use in decoding video data by video decoder 30, e.g., in intra- or inter-coding modes. CPB 79 and reference picture memory 92 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 79 and reference picture memory 92 may be provided by the same memory device or separate memory devices. In various examples, CPB 79 may be on-chip with other components of video decoder 30, or off-chip relative to those components.

During the decoding process, video decoder 30 receives an encoded video bitstream that represents video blocks of an encoded video slice and associated syntax elements from video encoder 20. Video decoder 30 may receive the encoded video bitstream from network entity 29. Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30. Network entity 29 may be considered to be a video device. Furthermore, in some examples, network entity 29 is the file generation device 34 of FIG. 1.

Entropy decoding unit 80 of video decoder 30 entropy decodes particular syntax elements of the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and may use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Video decoder 30 of FIG. 3 represents an example of a video decoder configured to decode video data that may be stored using the file format techniques described in this disclosure.

Figure 4:
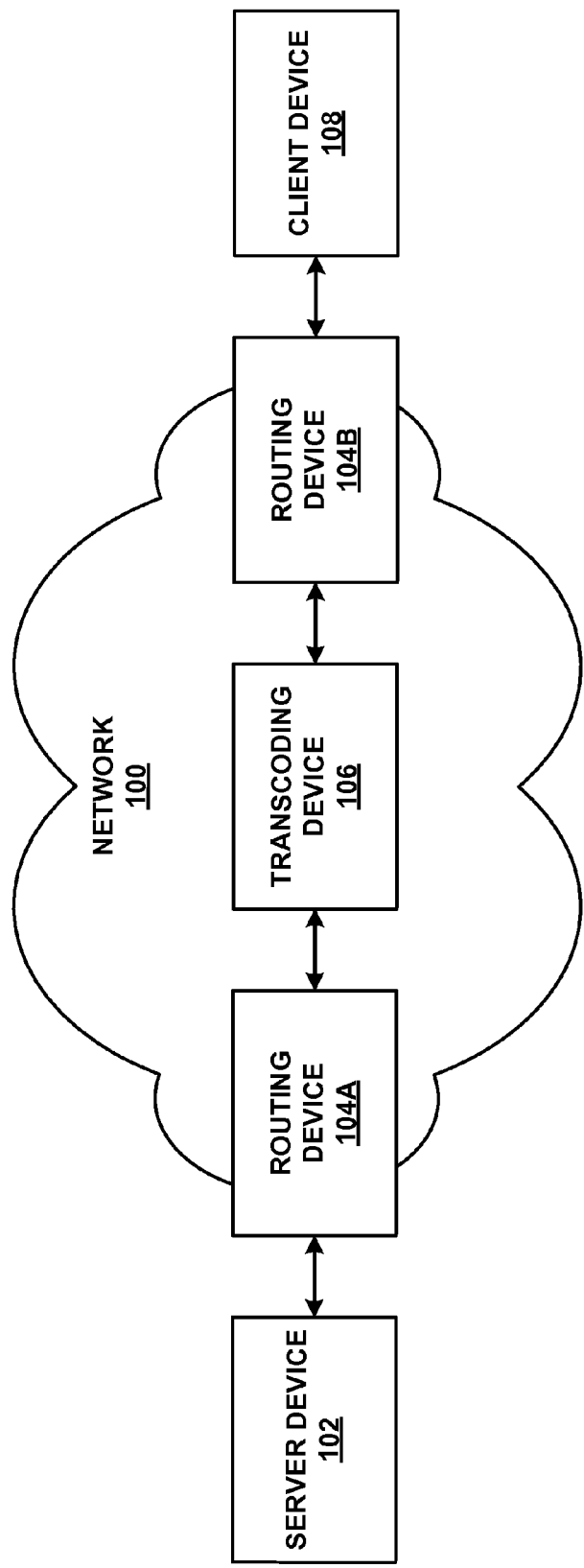
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure. Moreover, the devices of FIG. 1, and encoder 20 illustrated in FIG. 2 and decoder 30 illustrated in FIG. 3 are also examples of devices that can be configured to perform one or more of the techniques of this disclosure.

FIG. 5 is a conceptual diagram illustrating an example structure of a file 300, in accordance with one or more techniques of this disclosure. In the example of FIG. 5, file 300 includes a movie box 302 and a plurality of media data boxes 304. Although illustrated in the example of FIG. 5 as being in the same file, in other examples movie box 302 and media data boxes 304 may be in separate files. As indicated above, a box may be an object-oriented building block defined by a unique type identifier and length. For instance, a box may be the elementary syntax structure in the ISOBMFF, including a four-character coded box type, a byte count of the box, and a payload.

Movie box 302 may contain metadata for tracks of file 300. Each track of file 300 may comprise a continuous stream of media data. Each of media data boxes 304 may include one or more samples 305. Each of samples 305 may comprise an audio or video access unit. As described elsewhere in this disclosure, each access unit may comprise multiple coded pictures in multi-view coding (e.g., MV-HEVC and 3D-HEVC) and scalable video coding (e.g., SHVC). For instance, an access unit may include one or more coded pictures for each layer.

Furthermore, in the example of FIG. 5, movie box 302 includes a track box 306. Track box 306 may enclose metadata for a track of file 300. In other examples, movie box 302 may include multiple track boxes for different tracks of file 300. Track box 306 includes a media box 307. Media box 307 may contain all objects that declare information about the media data within the track. Media box 307 includes a media information box 308. Media information box 308 may contain all objects that declare characteristic information of the media of the track. Media information box 308 includes a sample table box 309. Sample table box 309 may specify sample-specific metadata.

In the example of FIG. 5, sample table box 309 includes a SampleToGroup box 310 and a SampleGroupDescription box 312. In other examples, sample table box 309 may include other boxes in addition to SampleToGroup box 310 and SampleGroupDescription box 312, and/or may include multiple SampleToGroup boxes and SampleGroupDescription boxes. SampleToGroup box 310 may map samples (e.g., particular ones of samples 305) to a group of samples. SampleGroupDescription Box 312 may specify a property shared by the samples in the group of samples (i.e., sample group). Furthermore, sample table box 309 may include a plurality of sample entry boxes 311. Each of the sample entry boxes 311 may correspond to a sample in the group of samples. In some examples, sample entry boxes 311 are instances of a Random Accessible Sample Entry class that extends a base sample group description class as defined in section 9.5.5.1.2, above.

In accordance with one or more techniques of this disclosure, SampleGroupDescription Box 312 may specify that each sample of the sample group contains at least one IRAP picture. In this way, file generation device 34 may generate a file that comprises a track box 306 that contains metadata for a track in file 300. Media data for the track comprises a sequence of samples 305. Each of the samples may be a video access unit of multi-layer video data (e.g., SHVC, MV-HEVC, or 3D-HEVC video data). Furthermore, as part of generating file 300, file generation device 34 may generate, in file 300, an additional box (i.e., sample table box 309) that documents all of samples 305 containing at least one IRAP picture. In other words, the additional box identifies all of samples 305 containing at least one IRAP picture. In the example of FIG. 5, the additional box defines a sample group that documents (e.g., identifies) all of samples 305 containing at least one IRAP picture. In other words, the additional box specifies that the samples 305 containing at least one IRAP picture belong to a sample group.

Furthermore, in accordance with one or more techniques of this disclosure, each of sample entry boxes 311 may include a value (e.g., all_pics_are_IRAP) indicating whether all coded pictures in the corresponding sample are IRAP pictures. In some examples, the value being equal to 1 specifies that not all coded picture the sample are IRAP pictures. The value being equal to 0 specifies that it is not required that each coded picture in each sample of the sample group is an IRAP picture.

In some examples, when not all coded pictures in a particular sample are IRAP pictures, file generation device 34 may include, in one of sample entry boxes 311 for the particular sample, a value (e.g., num_IRAP_pics) indicating a number of IRAP pictures in the particular sample. Additionally, file generation device 34 may include, in the sample entry for the particular sample, values indicating layer identifiers of IRAP pictures in the particular sample. File generation device 34 may also include, in the sample entry for the particular sample, a value indicating a NAL unit type of VCL NAL units in IRAP pictures of the particular sample.

Furthermore, in the example of FIG. 5, sample table box 309 includes a sub-sample information box 314. Although the example of FIG. 5 only shows one sub-sample information box, sample table box 309 may include multiple sub-sample information boxes. In general, a sub-sample information box is designed to contain sub-sample information.

A sub-sample is a contiguous range of bytes of a sample. ISO/IEC 14496-12 indicates that the specific definition of a sub-sample shall be supplied for a given coding system, such as H.264/AVC or HEVC.

Section 8.4.8 of ISO/IEC 14496-15 specifies a definition of a sub-sample for HEVC. Particularly, section 8.4.8 of ISO/IEC 14496-15 specifies that for the use of the sub-sample information box (8.7.7 of ISO/IEC 14496-12) in a HEVC stream, a sub-sample is defined on the basis of a value of a flags field of the sub-sample information box. In accordance with one or more techniques of this disclosure, if the flags field in sub-sample information box 314 is equal to 5, a sub-sample corresponding to sub-sample information box 314 contains one coded picture and the associated non-VCL NAL units. The associated non-VCL NAL units may include NAL units containing SEI messages applicable to the coded picture and NAL units containing parameter sets (e.g., VPSs, SPSs, PPSs, etc.) applicable to the coded picture.

Thus, in one example, file generation device 34 may generate a file (e.g., file 300) that comprises a track box (e.g., track box 306) that contains metadata for a track in the file. In this example, media data for the track comprises a sequence of samples, each of the samples being a video access unit of multi-layer video data (e.g., SHVC, MV-HEVC, or 3D-HEVC video data). Furthermore, in this example, as part of file generation device 34 generating the file, file generation device 34 may generate, in the file, a sub-sample information box (e.g., sub-sample information box 314) that contains flags that specify a type of sub-sample information given in the sub-sample information box. When the flags have a particular value, a sub-sample corresponding to the sub-sample information box contains exactly one coded picture and zero or more non-VCL NAL units associated with the coded picture.

Furthermore, in accordance with one or more techniques of this disclosure, if the flags field of sub-sample information box 314 is equal to 0, sub-sample information box 314 further includes a DiscardableFlag value, a NoInterLayer-PredFlag value, a LayerId value, and a TempId value. If the flags field of sub-sample information box 314 is equal to 5, sub-sample information box 314 may include a DiscardableFlag value, a VclNalUnitType value, a LayerId value, a TempId value, a NoInterLayerPredFlag value, a SubLayerRefNalUnitFlag value, and a reserved value.

SubLayerRefNalUnitFlag equal to 0 indicates that all NAL units in the sub-sample are VCL NAL units of a sub-layer non-reference picture as specified in ISO/IEC 23008-2 (i.e., HEVC). SubLayerRefNalUnitFlag equal to 1 indicates that all NAL units in the sub-sample are VCL NAL units of a sub-layer reference picture as specified in ISO/IEC 23008-2 (i.e., HEVC). Thus, when file generation device 34 generates sub-sample information box 314 and the flags have a particular value (e.g., 5), file generation device 34 includes, in sub-sample information box 314, an additional flag that indicates whether all NAL units in the sub-sample are VCL NAL units of a sub-layer non-reference picture.

The DiscardableFlag value indicates a value of a discardable_flag value of the VCL NAL units in the sub-sample. As specified in section A.4 of ISO/IEC 14496-15, the discardable_flag value shall be set to 1 if and only if all the extracted or aggregated NAL units have the discardable_flag set to 1, and set to 0 otherwise. A NAL unit may have a discardable_flag set to 1 if a bitstream containing the NAL unit may be correctly decoded without the NAL unit. Thus, a NAL unit may be "discardable" if a bitstream containing the NAL unit may be correctly decoded without the NAL unit. All the VCL NAL units in the sub-sample shall have the same discardable_flag value. Thus, when file generation device 34 generates sub-sample information box 314 and the flags have a particular value (e.g., 5), file generation device 34 includes, in sub-sample information box 314, an additional flag (e.g., discardable_flag) that indicates whether all of the VCL NAL units of the sub-sample are discardable.

The NoInterLayerPredFlag value indicates the value of the inter_layer_pred_enabled_flag of the VCL NAL units in the sub-sample. The inter_layer_pred_enabled_flag shall be set to 1 if and only if all the extracted or aggregated VCL NAL units have the inter_layer_pred_enabled_flag set to 1, and set to 0 otherwise. All the VCL NAL units in the sub-sample shall have the same value of inter_layer_pred_enabled_flag. Thus, when file generation device 34 generates sub-sample information box 314 and the flags have a particular value (e.g., 5), file generation device 34 includes, in sub-sample information box 314, an additional value (e.g., inter_layer_pred_enabled_flag) that indicates whether inter-layer prediction is enabled for all VCL NAL units of the sub-sample.

LayerId indicates the nuh_layer_id value of the NAL units in the sub-sample. All the NAL units in the sub-sample shall have the same nuh_layer_id value. Thus, when file generation device 34 generates sub-sample information box 314 and the flags have a particular value (e.g., 5), file generation device 34 includes, in sub-sample information box 314, an additional value (e.g., LayerId) that indicates a layer identifier of each NAL unit of the sub-sample.

TempId indicates the TemporalId value of the NAL units in the sub-sample. All the NAL units in the sub-sample shall have the same TemporalId value. Thus, when file generation device 34 generates sub-sample information box 314 and the flags have a particular value (e.g., 5), file generation device 34 includes in, sub-sample information box 314, an additional value (e.g., TempId) that indicates a temporal_identifier of each NAL unit of the sub-sample.

VclNalUnitType indicates the nal_unit_type syntax element of the VCL NAL units in the sub-sample. The nal_unit_type syntax element is a syntax element in a NAL unit header of a NAL unit. The nal_unit_type syntax element specifies the type of the RBSP contained in the NAL unit. All the nal_unit_type VCL NAL units in the sub-sample shall have the same nal_unit_type value. Thus, when file generation device 34 generates sub-sample information box 314 and the flags have a particular value (e.g., 5), file generation device 34 includes, in sub-sample information box 314, an additional value (e.g., VclNalUnitType) that indicates a NAL unit type of VCL NAL units of the sub-sample. All the VCL NAL units of the sub-sample have the same NAL unit type.

FIG. 6 is a conceptual diagram illustrating an example structure of a file 300, in accordance with one or more techniques of this disclosure. As specified in section 8.4.9 of ISO/IEC 14496-15, HEVC allows for file format samples that are used only for reference and not output. For example, HEVC allows for a non-displayed reference picture in video.

Furthermore, section 8.4.9 of ISO/IEC 14496-15 specifies that when any such non-output sample is present in a track, the file shall be constrained as follows.

1. A non-output sample shall be given a composition time which is outside the time-range of the samples that are output.
2. An edit list shall be used to exclude the composition times of the non-output samples.
3. When the track includes a CompositionOffsetBox ('ctts'),
   a. version 1 of the CompositionOffsetBox shall be used,
   b. the value of sample_offset shall be set equal to $-2^{31}$ for each non-output sample,
   c. the CompositionToDecodeBox ('cslg') should be contained in the SampleTableBox ('stbl') of the track, and
   d. when the CompositionToDecodeBox is present for the track, the value of leastDecodeToDisplayDelta field in the box shall be equal to the smallest composition offset in the CompositionOffsetBox excluding the sample_offset values for non-output samples. NOTE: Thus, leastDecodeToDisplayDelta is greater than $-2^{31}$.

As specified in ISO/IEC 14496-12, the CompositionOffsetBox provides the offset between decoding time and composition time. The CompositionOffsetBox includes a set of sample_offset values. Each of the sample_offset values is a nonnegative integer that gives the offset between composition time and decoding time. Composition time refers to a time at which a sample is to be output. Decoding time refers to a time at which a sample is to be decoded.

As indicated above, a coded slice NAL unit may include a slice segment header. The slice segment header may be part of a coded slice segment and may contain data elements pertaining to the first or all CTUs in the slice segment. In HEVC, the slice segment header includes a pic_output_flag syntax element. In general, the pic_output_flag syntax element is included in a first slice segment header of a slice of a picture. Hence, this disclosure may refer to the pic_output_flag of the first slice segment header of the slice of the picture as the pic_output_flag of the picture.

As specified in section 7.4.7.1 of the HEVC WD, the pic_output_flag syntax element affects the decoded picture output and removal processes as specified in Annex C of HEVC WD. In general, if the pic_output_flag syntax element of a slice segment header for a slice segment is 1, a picture that includes a slice corresponding to the slice segment header is output. Otherwise, if the pic_output_flag syntax element of the slice segment header for a slice segment is 0, the picture that includes the slice corresponding to the slice segment header may be decoded for use as a reference picture, but is not output.

In accordance with one or more techniques of this disclosure, the references in section 8.4.9 of ISO/IEC 14496-15 to HEVC may be replaced with corresponding references to SHVC, MV-HEVC, or 3D-HEVC. Furthermore, in accordance with one or more techniques of this disclosure, when an access unit contains some coded pictures that have pic_output_flag equal to 1 and some other coded pictures that have pic_output_flag equal to 0, at least two tracks must be used to store the stream. For each respective one of the tracks, all coded pictures in each sample of the respective track have the same value of pic_output_flag. Thus, all coded pictures in a first one of the tracks have pic_output_flag equal to 0 and all coded pictures in a second one of the tracks have pic_output_flag equal to 1.

Accordingly, in the example of FIG. 6, file generation device 34 may generate a file 400. Similar to file 300 in the example of FIG. 5, file 400 includes a movie box 402 and one or more media data boxes 404. Each of media data boxes 404 may correspond to a different track of file 400. Movie box 402 may contain metadata for tracks of file 400. Each track of file 400 may comprise a continuous stream of media data. Each of media data boxes 404 may include one or more samples 405. Each of samples 405 may comprise an audio or video access unit.

As indicated above, in some examples, when an access unit contains some coded pictures that have pic_output_flag equal to 1 and some other coded pictures that have pic_output_flag equal to 0, at least two tracks must be used to store the stream. Accordingly, in the example of FIG. 6, movie box 402 includes a track box 406 and a track box 408. Each of track boxes 406 and 408 enclose metadata for a different track of file 400. For instance, track box 406 may enclose metadata for a track having coded pictures with pic_output_flag equal to 0, and no pictures with pic_output_flag equal to 1. Track box 408 may enclose metadata for a track having coded pictures with pic_output_flag equal to 1, and no pictures with pic_output_flag equal to 0.

Thus, in one example, file generation device 34 may generate a file (e.g., file 400) that comprises a media data box (e.g., media data box 404) that encloses (e.g., comprises) media content. The media content comprises a sequence of samples (e.g., samples 405). Each of the samples may be an access unit of multi-layer video data. In this example, when file generation device 34 generates the file, responsive to a determination that at least one access unit of the bitstream includes a coded picture that has a picture output_flag equal to 1 and a coded picture that has a picture output_flag equal to 0, file generation device 34 may use at least two tracks to store the bitstream in the file. For each respective track from the at least two tracks, all coded pictures in each sample of the respective track have the same value of the picture output_flag. Pictures having picture output_flags equal to 1 are allowed to be output and pictures having picture output_flags equal to 0 are allowed to be used as reference pictures but are not allowed to be output.

Figure 7:
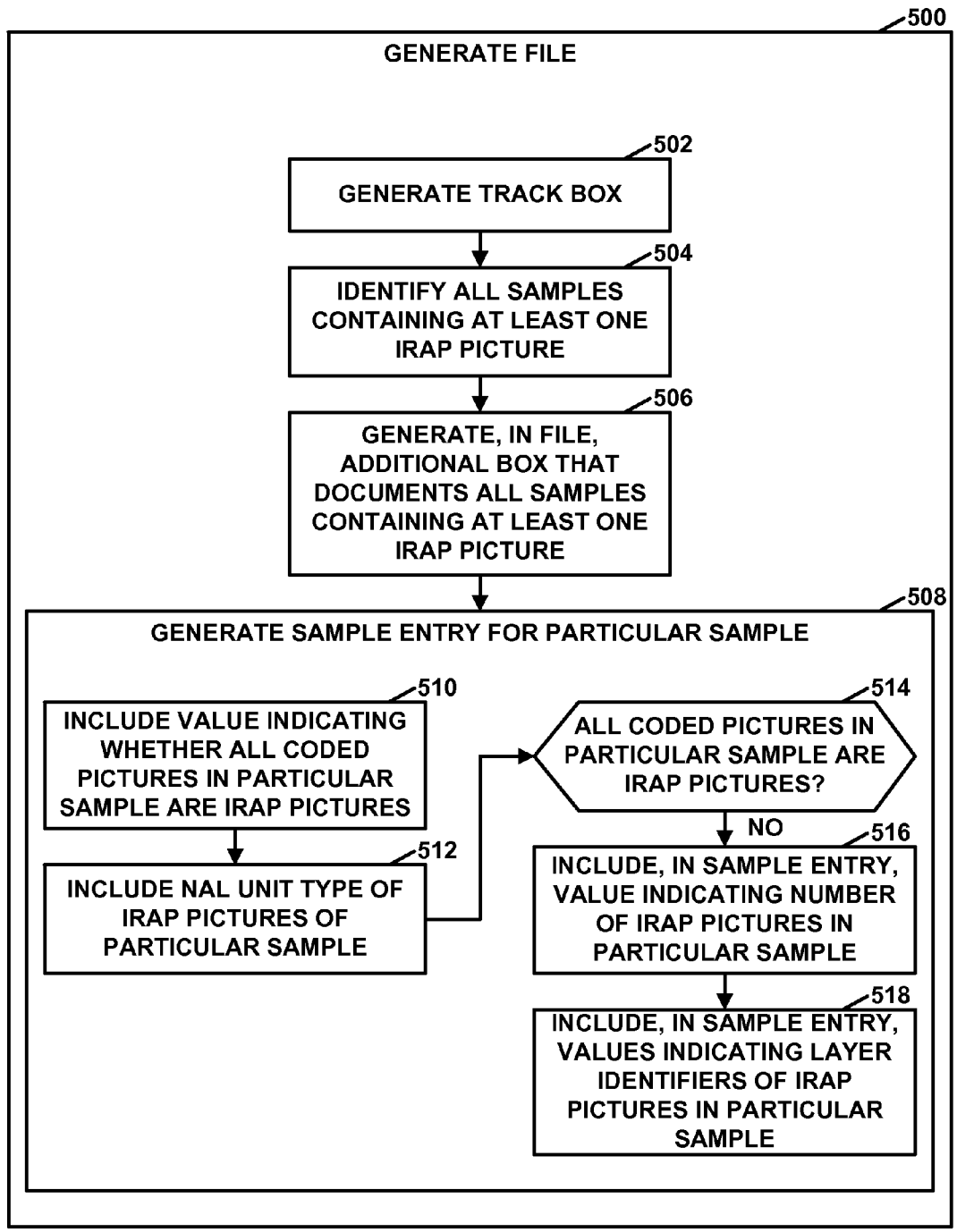
FIG. 7 is a flowchart illustrating an example operation of a file generation device, in accordance with one or more techniques of this disclosure.

FIG. 7 is a flowchart illustrating an example operation of file generation device 34, in accordance with one or more techniques of this disclosure. The operation of FIG. 7, along with operations illustrated in other flowcharts of this disclosure, are examples. Other example operations in accordance with the techniques of this disclosure may include more, fewer, or different actions.

In the example of FIG. 7, file generation device 34 generates a file (500). As part of generating the file, file generation device 34 generates a track box that contains metadata for a track in the file (502). In this way, file generation device 34 generates a file that comprises a track box that contains metadata for a track in the file. Media data for the track comprises a sequence of samples. Each of the samples is a video access unit of the multi-layer video data. In some examples, file generation device 34 encodes the multi-layer video data.

Furthermore, as part of generating the file, file generation device 34 identifies all of the samples that contain at least one IRAP picture (504). In addition, file generation device 34 may generate, in the file, an additional box that documents all the samples containing at least one IRAP picture (506). In some examples, the additional box is a new box that is not defined in the ISOBMFF or existing extensions thereof. In some examples, the additional box defines a sample group that documents all of the samples containing at least one IRAP picture. For instance, the additional box may be or comprise a Sample Table Box that includes a SampleToGroup box and a SampleGroupDescription box. The SampleToGroup box identifies the samples that contain at least one IRAP picture. The SampleGroupDescription box indicates that the sample group is a group of samples containing at least one IRAP picture.

Furthermore, in the example of FIG. 7, file generation device 34 may generate a sample entry for a particular one of the samples that includes at least one IRAP picture (508). In some examples, file generation device 34 may generate a sample entry for each respective one of the samples includes at least one IRAP picture. The sample entry may be a RandomAccessibleSampleEntry as defined in section 9.5.5.1.2, above.

As illustrated in the example of FIG. 7, as part of generating the sample entry for the particular sample, file generation device 34 may include, in the sample entry for the particular sample, a value indicating whether all coded pictures in the particular sample are IRAP pictures (510). In this way, file generation device 34 may generate, in the file, a sample entry that includes a value indicating whether all coded pictures in a particular sample in the sequence of samples are IRAP pictures. Furthermore, file generation device 34 may include, in the sample entry for the particular sample, a value indicating a NAL unit type of VCL NAL units in IRAP pictures of the particular sample (512).

In addition, file generation device 34 may determine whether all coded pictures in the particular sample are IRAP pictures (514). When not all coded pictures in the particular sample are IRAP pictures ("NO" of 514), file generation device 34 may include, in the sample entry for the particular sample, a value indicating a number of IRAP pictures in the particular sample (516). Additionally, file generation device 34 may include, in the sample entry for the particular sample, values indicating layer identifiers (e.g., nuh_layer_ids) of IRAP pictures in the particular sample.

As indicated above, FIG. 7 is provided as an example. Other examples do not include each action of FIG. 7. For instance, some examples exclude steps 502, 504 and 508. Moreover, some examples exclude various ones of steps 510-518. Moreover, some examples include one or more additional actions. For instance, some examples include an additional action of generating, as part of generating the file, a sync sample box that includes a sync sample table that documents sync samples of a track of the multi-layer video data. Each sync sample of the track is a random access sample of the track. In this example, a scalable video coding sample is a sync sample if each coded picture in an access unit is an IRAP picture. Furthermore, in this example, a multi-view video coding sample is a sync sample if each coded picture in the access unit is an IRAP picture without RASL pictures.

Figure 8:
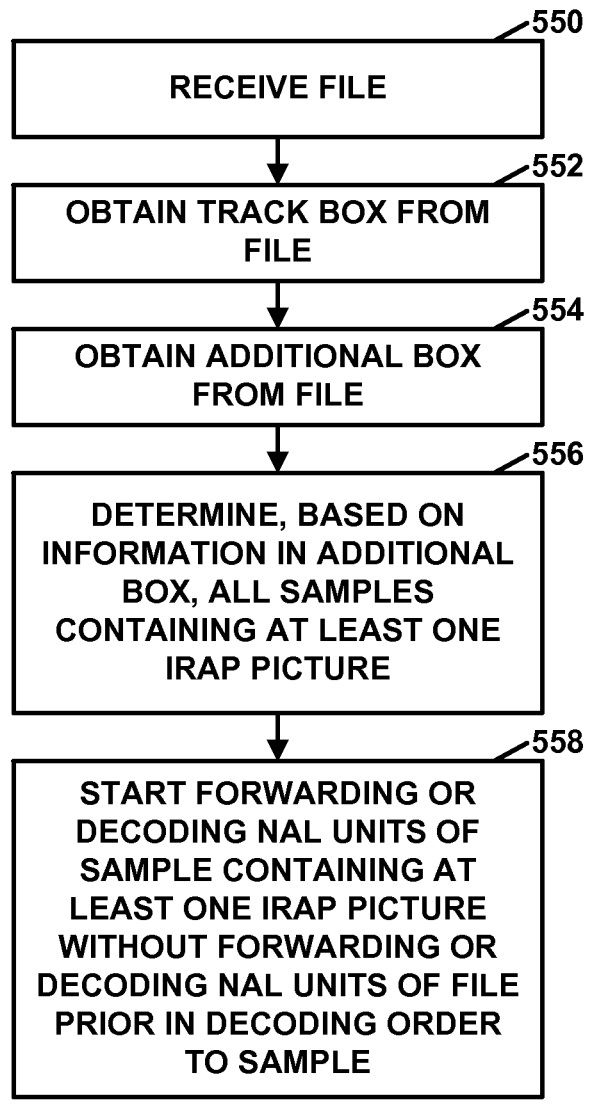
FIG. 8 is a flowchart illustrating an example operation in which a computing device performs random access and/or level switching, in accordance with one or more techniques of this disclosure.

FIG. 8 is a flowchart illustrating an example operation in which a computing device performs random access and/or level switching, in accordance with one or more techniques of this disclosure. In the example of FIG. 8, a computing device receives a file (550). In the example of FIG. 8, the computing device may be an intermediate network device (e.g., a MANE, a streaming server), a decoding device (e.g., destination device 14), or another type of video device. In some examples, the computing device may be part of a content delivery network.

In the example of FIG. 8, the computing device may obtain, from the file, a track box that contains metadata for a track in the file (552). Media data for the track comprises a sequence of samples. In the example of FIG. 8, each of the samples is a video access unit of multi-layer video data.

Furthermore, in the example of FIG. 8, the computing device may obtain an additional box from the file (554). The additional box documents all of the samples containing at least one IRAP picture. Thus, the computing device may determine, based on information in the additional box, all samples containing at least one IRAP picture (556).

Furthermore, in some examples, the computing device may obtain, from the file, a sample entry that includes a value indicating whether all coded pictures in a particular sample in the sequence of samples are IRAP pictures. When not all coded pictures in the particular sample are IRAP pictures, the computing device may obtain, from the sample entry, a value indicating a number of IRAP pictures in the particular sample. Additionally, the computing device may obtain, from the sample entry, values indicating layer identifiers of IRAP pictures in the particular sample. Furthermore, in some examples, the computing device may obtain, from the sample entry, a value indicating a NAL unit type of VCL NAL units in IRAP pictures of the particular sample. Additionally, in some examples, the computing device may obtain, from the file, a sync sample box that includes a sync sample table that documents sync samples of a track of the video data. In such examples, each sync sample of the track is a random access sample of the track, a scalable video coding sample is a sync sample if each coded picture in an access unit is an IRAP picture, and a multi-view video coding sample is a sync sample if each coded picture in the access unit is an IRAP picture without RASL pictures.

Additionally, in the example of FIG. 8, the computing device may start forwarding or decoding NAL units of a sample containing at least one IRAP picture without forwarding or decoding NAL units of the file prior in decoding order to the sample (558). In this way, the computing device may perform random access or layer switching. For instance, the computing device may start decoding of multi-layer video data at one of the one or more samples containing at least one IRAP picture.

Figure 9:
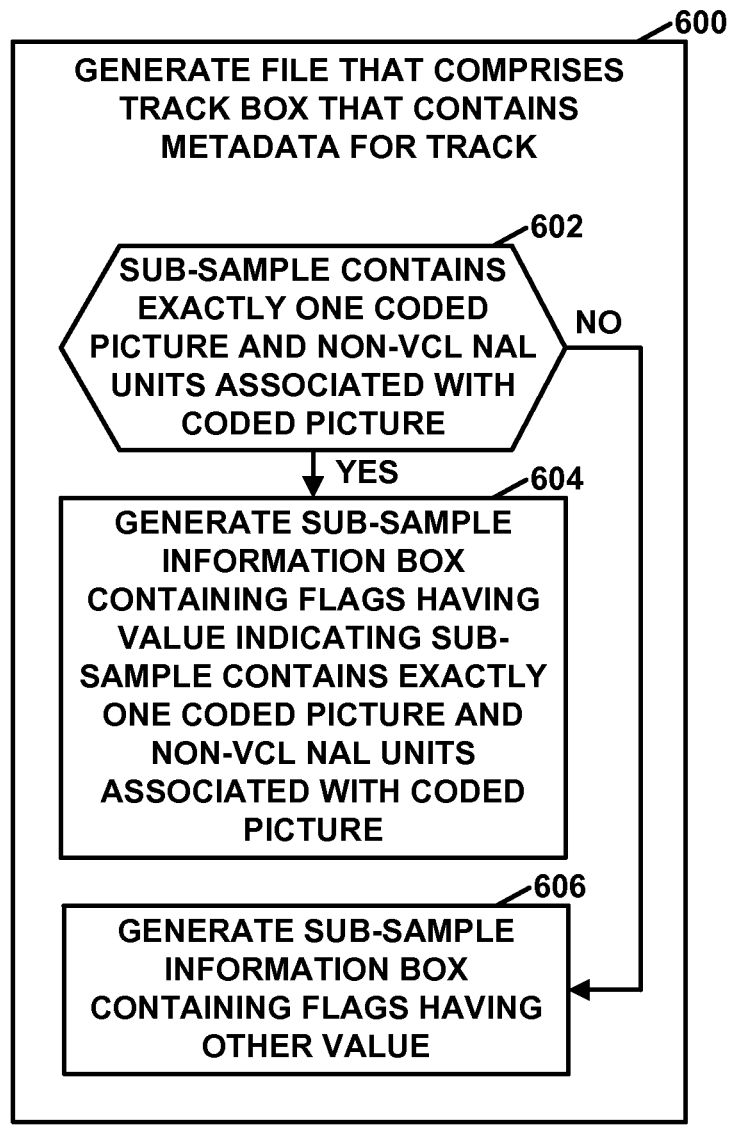
FIG. 9 is a flowchart illustrating an example operation of a file generation device, in accordance with one or more techniques of this disclosure.

FIG. 9 is a flowchart illustrating an example operation of file generation device 34, in accordance with one or more techniques of this disclosure. In the example of FIG. 9, file generation device 34 may generate a file that comprises a track box that contains metadata for a track in the file (600).

Media data for the track comprises a sequence of samples. In the example of FIG. 9, each of the samples is a video access unit of the multi-layer video data. In some examples, file generation device 34 encodes the multi-layer video data.

As part of generating the file, file generation device 34 may determine whether a sub-sample contains exactly one coded picture and zero or more non-VCL NAL units associated with the coded picture (602). Responsive to determining that the sub-sample contains exactly one coded picture and zero or more non-VCL NAL units associated with the coded picture ("YES" of 602), file generation device 34 may generate, in the file, a sub-sample information box that contains flags that having a value (e.g., 5) indicating that the sub-sample contains exactly one coded picture and zero or more non-VCL NAL units associated with the coded picture (604). Otherwise ("NO" of 602), file generation device 34 may generate, in the file, the sub-sample information box that contains flags having another value (e.g., 0, 1, 2, 3, 4) (606).

In this way, file generation device 34 may generate a file that comprises a track box that contains metadata for a track in the file. Media data for the track comprises a sequence of samples, each of the samples being a video access unit of multi-layer video data. As part of generating the file, file generation device 34 generates, in the file, a sub-sample information box that contains flags that specify a type of sub-sample information given in the sub-sample information box. When the flags have a particular value, a sub-sample corresponding to the sub-sample information box contains exactly one coded picture and zero or more non-VCL NAL units associated with the coded picture.

Figure 10:
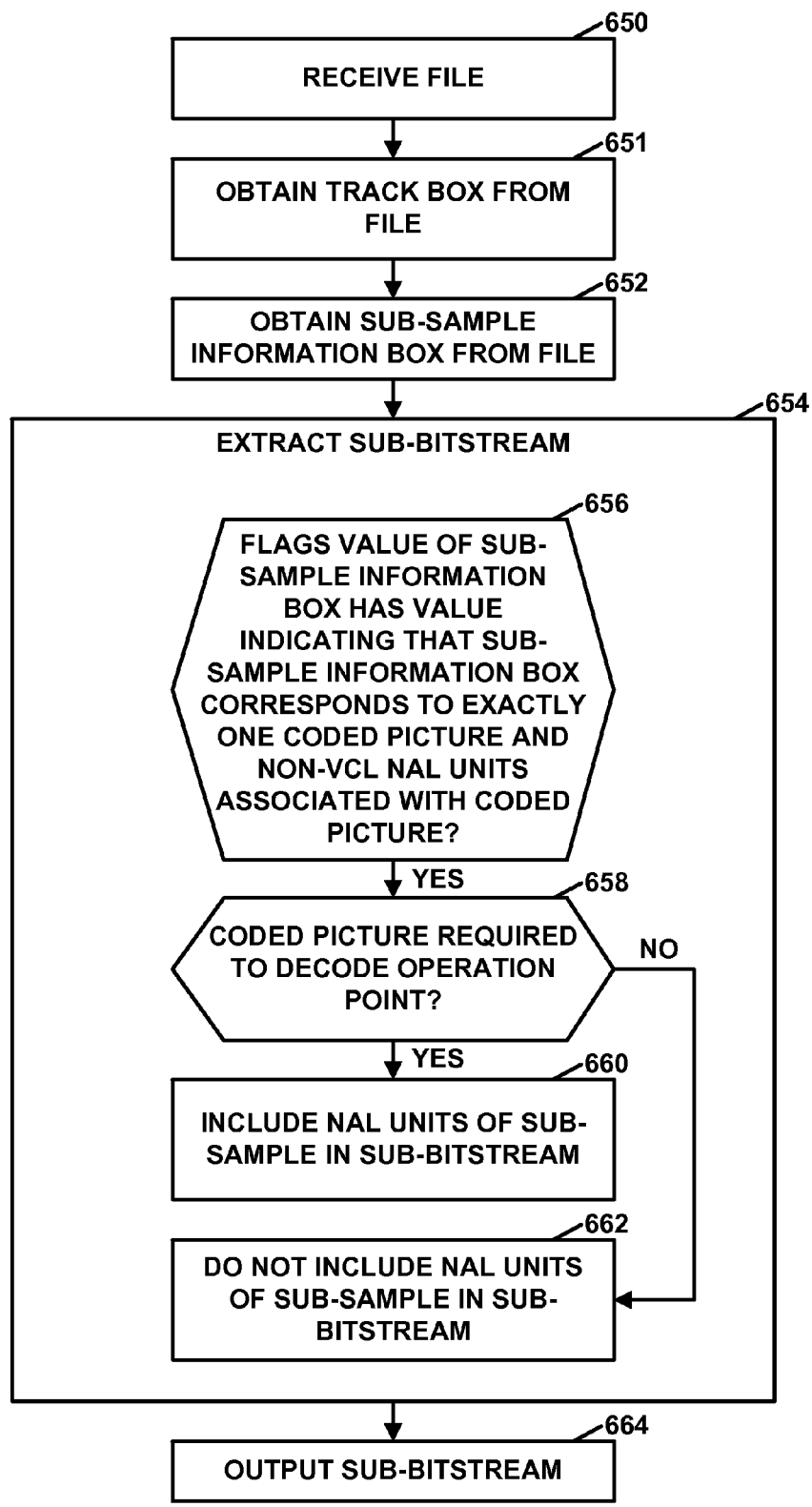
FIG. 10 is a flowchart illustrating an example operation of a computing device, in accordance with one or more techniques of this disclosure.

FIG. 10 is a flowchart illustrating an example operation of a computing device, in accordance with one or more techniques of this disclosure. In the example of FIG. 10, a computing device receives a file (650). In the example of FIG. 10, the computing device may be an intermediate network device, such as a MANE or a streaming server. In some examples, the computing device may be part of a content delivery network. Furthermore, in the example of FIG. 10, the computing device may obtain a track box from the file (651). The track box contains metadata for a track in the file. Media data for the track comprises a sequence of samples. In the example of FIG. 10, each of the samples is a video access unit of multi-layer video data.

Furthermore, in the example of FIG. 10, the computing device may obtain a sub-sample information box from the file (652). The computing device uses information in the sub-sample information box to extract a sub-bitstream (654). The sub-bitstream may comprise each NAL unit of an operation point of a bitstream stored in the file. In other words, the NAL units of the sub-bitstream may be a subset of the NAL units stored in the file. The computing device may obtain the sub-sample information box from the file and may extract the sub-bitstream without parsing or interpreting NAL units included in the sequence of samples. Not parsing or interpreting the NAL units when extracting the sub-bitstream may reduce the complexity of the computing device and/or may accelerate the process of extracting the sub-bitstream.

Furthermore, in some examples, the computing device may obtain, when the flags have the particular value, from the sub-sample information box, one or more of:

an additional flag that indicates whether all of the VCL NAL units of the sub-sample are discardable, an additional value that indicates a NAL unit type of VCL NAL units of the sub-sample, wherein all the VCL NAL units of the sub-sample have the same NAL unit type, an additional value that indicates a layer identifier of each NAL unit of the sub-sample, an additional value that indicates a temporal_identifier of each NAL unit of the sub-sample, an additional flag that indicates whether inter-layer prediction is enabled for all VCL NAL units of the sub-sample, or an additional flag that indicates whether all NAL units in the sub-sample are VCL NAL units of a sub-layer non-reference picture.

In the example of FIG. 10, as part of extracting the sub-bitstream, the computing device may determine whether a "flags" value of the sub-sample information box has a particular value (e.g., 5) indicating that the sub-sample information box corresponds to exactly one coded picture and zero or more non-VCL NAL units associated with the coded picture (656). When the "flags" value of the sub-sample information box has the particular value ("YES" of 656), the computing device may determine, based on information specified in the sub-sample information box, whether the coded picture is required in order to decode the operation point (658). For example, the computing device may determine, based on a discardable_flag, a VCL NAL unit type indicator, a layer identifier, a temporal_identifier, a no_inter_layer prediction flag, and/or a sub-layer reference NAL unit flag, whether the coded picture is required in order to decode the operation point. When the coded picture is required to decode the operation point ("YES" of 658), the computing device may include NAL units of the sub-sample in the sub-bitstream (660). Otherwise, in the example of FIG. 10, when the coded picture is not required to decode the operation point ("NO" of 658), the computing device does not include NAL units of the sub-sample in the sub-bitstream (662).

Furthermore, in the example of FIG. 10, the computing device may output the sub-bitstream (664). For instance, the computing device may store the sub-bitstream to a computer-readable storage medium or transmit the sub-bitstream to another computing device.

As indicated above, FIG. 10 is an example. Other examples may include or omit particular actions of FIG. 10. For instance, some examples omit actions 650, 651, 654, and/or 664. Furthermore, some examples omit actions one or more of actions 656-662.

Figure 11:
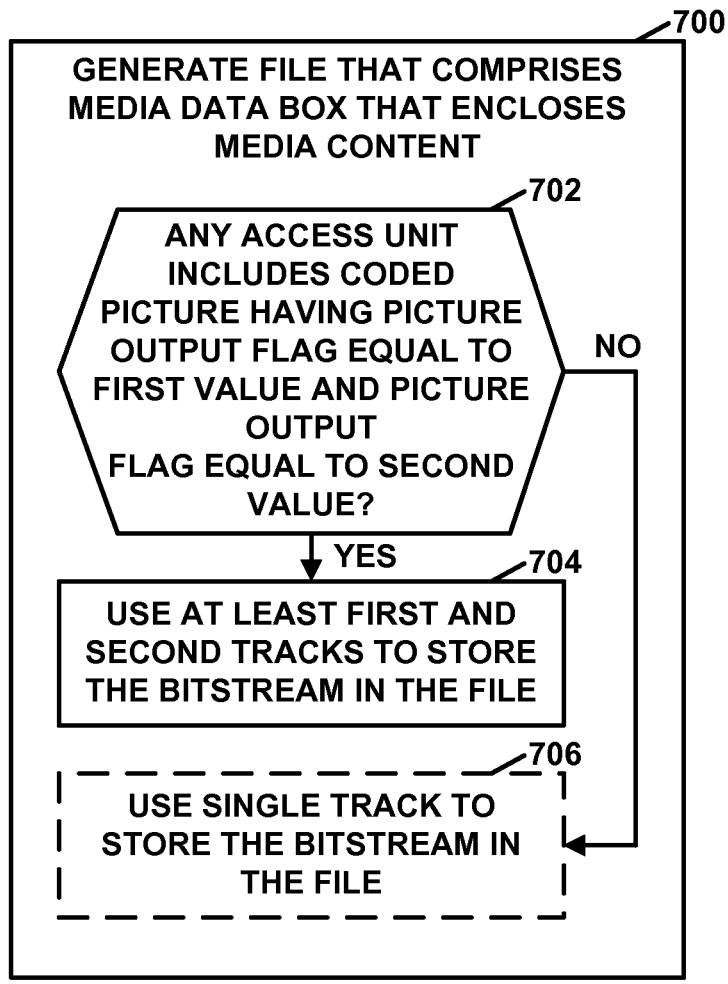
FIG. 11 is a flowchart illustrating an example operation of a file generation device, in accordance with one or more techniques of this disclosure.

FIG. 11 is a flowchart illustrating an example operation of file generation device 34, in accordance with one or more techniques of this disclosure. In the example of FIG. 11, file generation device 34 may generate a file that comprises a media data box that encloses media content (700). The media content may comprise a sequence of samples, each of the samples being an access unit of multi-layer video data.

In various examples, the multi-layer video data may be SHVC data, MV-HEVC data, or 3D-HEVC data. In some examples, file generation device 34 encodes the multi-layer video data.

In the example of FIG. 11, as part of generating the file, file generation device 34 may determine whether at least one access unit of a bitstream of the multi-layer video data includes a coded picture that has a picture output_flag equal to a first value (e.g., 1) and a coded picture that has a picture output_flag equal to a second value (e.g., 0) (702). Pictures having picture output_flags equal to the first value (e.g., 1) are allowed to be output and pictures having picture output_flags equal to the second value (e.g., 0) are allowed to be used as reference pictures but are not allowed to be output. In other examples, other devices may make the determination whether at least one access unit of a bitstream of the multi-layer video data includes a coded picture that has a picture output_flag equal to the first value and a coded picture that has a picture output_flag equal to the second value.

Responsive to a determination that at least one access unit of a bitstream of the multi-layer video data includes a coded picture that has a picture output_flag equal to the first value and a coded picture that has a picture output_flag equal to the second value ("YES" of 702), file generation device 34 uses at least a first track and a second track to store the bitstream in the file (704). For each respective track from the first and second tracks, all coded pictures in each sample of the respective track have the same value of the picture output_flag.

Furthermore, in the example of FIG. 11, responsive to determining that no access unit of the bitstream includes a coded picture that has a picture output_flag equal to the first value (e.g., 1) and a coded picture that has a picture output_flag equal to the second value (e.g., 0) ("NO" of 702), file generation device 34 may use a single track to store the bitstream in the file (706). In other examples, file generation device 34 may generate the file with multiple tracks even when no access unit of the bitstream includes a coded picture that has a picture output_flag equal to the first value (e.g., 1) and a coded picture that has a picture output_flag equal to the second value (e.g., 0).

As indicated above, FIG. 11 is an example. Other examples may include fewer actions. For instance, some examples omit actions 702 and 706.

Figure 12:
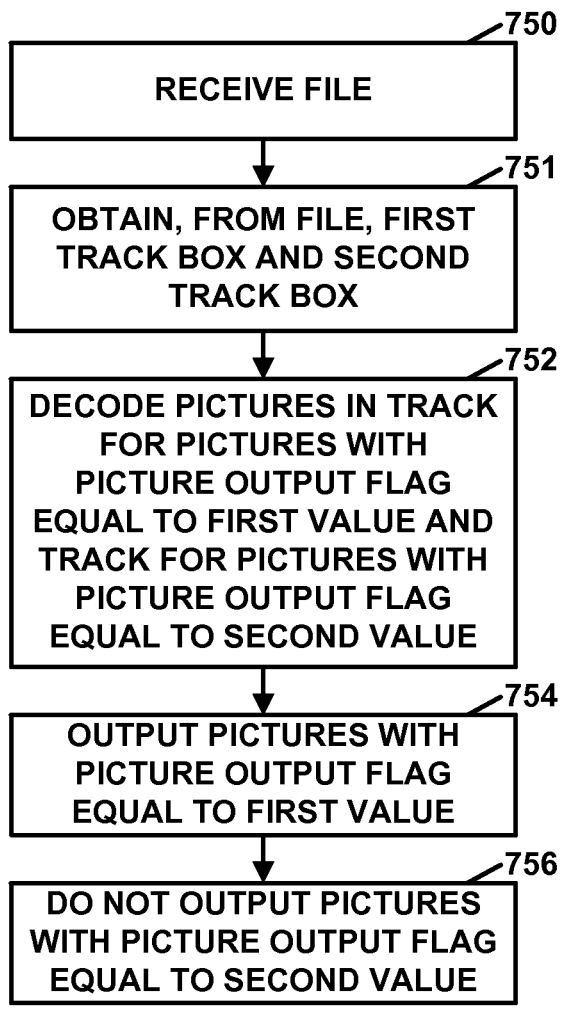
FIG. 12 is a flowchart illustrating an example operation of a destination device, in accordance with one or more techniques of this disclosure.

FIG. 12 is a flowchart illustrating an example operation of destination device 14, in accordance with one or more techniques of this disclosure. In the example of FIG. 12, destination device 14 receives a file (750). The file may comprise a media data box that encloses media content, the media content comprising a sequence of samples. Each of the samples may be an access unit of multi-layer video data. In various examples, the multi-layer video data may be SHVC data, MV-HEVC data, or 3D-HEVC data. Furthermore, in the example of FIG. 12, destination device 14 may obtain, from the file, a first track box and a second track box (751). The first track box contains metadata for a first track in the file. The second track box contains metadata for a second track in the file. For each respective track from the first track and the second track, all coded pictures in each sample of the respective track have the same value of the picture output flag. Pictures having picture output_flags equal to a first value (e.g., 1) are allowed to be output, and pictures having picture output_flags equal to a second value (e.g., 0) are allowed to be used as reference pictures but are not allowed to be output.

Video decoder 30 of destination device 14 may decode pictures in the track for pictures with picture output_flags equal to a first value (e.g., 1) and may decode pictures in the track for pictures with picture output_flags equal to a second value (e.g., 0) (752). In some instances, video decoder 30 may use pictures with picture output_flags equal to 1 to decode pictures with picture output_flags equal to 0, and vice versa. Destination device 14 may output the pictures with picture output_flags equal to the first value (754). Destination device 14 does not output the pictures with picture output_flags equal to the second value (756). In this way, for each respective track from the first and second track, destination device 14 may decode the coded pictures in each sample of the respective track and output the decoded pictures having picture output_flags equal to the first value.

As indicated above, FIG. 12 is provided as an example. Other examples may omit particular actions of FIG. 12, such as actions 752-756.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing multi-layer video data, the method comprising:
   generating a file that comprises a track box that contains metadata for a track in the file, wherein:
      media data for the track comprises a sequence of samples, each of the samples being a video access unit of the multi-layer video data;
      generating the file comprises generating, in the file, a sub-sample information box that contains flags that specify a type of sub-sample information given in the sub-sample information box,
      based on the flags having a particular value, a sub-sample corresponding to the sub-sample information box contains exactly one coded picture and zero or more non-Video Coding Layer (VCL) Network Abstraction Layer (NAL) units associated with the coded picture, and
      generating the sub-sample information box comprises, based on the flags having the particular value, including, in the sub-sample information box, an additional value that indicates a layer identifier of each NAL unit of the sub-sample.

2. The method of claim 1, wherein generating the sub-sample information box comprises:
   based on the flags having the particular value, including, in the sub-sample information box, an additional flag that indicates whether all of the VCL NAL units of the sub-sample are discardable.

3. The method of claim 1, wherein generating the sub-sample information box comprises:
   based on the flags having the particular value, including, in the sub-sample information box, an additional value that indicates a NAL unit type of VCL NAL units of the sub-sample,
   wherein all the VCL NAL units of the sub-sample have the same NAL unit type.

4. The method of claim 1, wherein generating the sub-sample information box comprises:
   based on the flags having the particular value, including, in the sub-sample information box, an additional value that indicates a temporal identifier of each NAL unit of the sub-sample.

5. The method of claim 1, wherein generating the sub-sample information box comprises:
   based on the flags having the particular value, including, in the sub-sample information box, an additional flag that indicates whether inter-layer prediction is enabled for all VCL NAL units of the sub-sample.

6. The method of claim 1, wherein generating the sub-sample information box comprises:
   based on the flags having the particular value, including, in the sub-sample information box, an additional flag that indicates whether all NAL units in the sub-sample are VCL NAL units of a sub-layer non-reference picture.

7. The method of claim 1, further comprising:
   encoding the multi-layer video data.

8. A method of processing multi-layer video data, the method comprising:
   obtaining, from a file, a track box that contains metadata for a track in the file, wherein media data for the track comprises a sequence of samples, each of the samples being a video access unit of the multi-layer video data; and
   obtaining, from the file, a sub-sample information box that contains flags that specify a type of sub-sample information given in the sub-sample information box, wherein based on the flags having a particular value, a sub-sample corresponding to the sub-sample information box contains exactly one coded picture and zero or more non-Video Coding Layer (VCL) Network Abstraction Layer (NAL) units associated with the coded picture,
   wherein obtaining the sub-sample information box comprises: based on the flags having the particular value, obtaining, from the sub-sample information box, an additional value that indicates a layer identifier of each NAL unit of the sub-sample.

9. The method of claim 8, comprising:
   based on the flags having the particular value, obtaining, from the sub-sample information box, an additional flag that indicates whether all of the VCL NAL units of the sub-sample are discardable.

10. The method of claim 8, comprising:
based on the flags having the particular value, obtaining, from the sub-sample information box, an additional value that indicates a NAL unit type of VCL NAL units of the sub-sample, and
all the VCL NAL units of the sub-sample have the same NAL unit type.

11. The method of claim 8, comprising:
based on the flags having the particular value, obtaining, from the sub-sample information box, an additional value that indicates a temporal identifier of each NAL unit of the sub-sample.

12. The method of claim 8, comprising:
based on the flags having the particular value, obtaining, from the sub-sample information box, an additional flag that indicates whether inter-layer prediction is enabled for all VCL NAL units of the sub-sample.

13. The method of claim 8, comprising:
based on the flags having the particular value, obtaining, from the sub-sample information box, an additional flag that indicates whether all NAL units in the sub-sample are VCL NAL units of a sub-layer non-reference picture.

14. The method of claim 8, further comprising:
responsive to a determination based on the information specified in the sub-sample information box that the coded picture is required in order to decode an operation point, including NAL units of the sub-sample in a sub-bitstream; and
outputting the sub-bitstream.

15. A video device comprising:
a data storage medium configured to store multi-layer video data; and
one or more processor circuits configured to:
generate a file that comprises a track box that contains metadata for a track in the file, wherein:
media data for the track comprises a sequence of samples, each of the samples being a video access unit of the multi-layer video data;
to generate the file, the one or more processor circuits generate, in the file, a sub-sample information box that contains flags that specify a type of sub-sample information given in the sub-sample information box,
based on the flags having a particular value, a sub-sample corresponding to the sub-sample information box contains exactly one coded picture and zero or more non-Video Coding Layer (VCL) Network Abstraction Layer (NAL) units associated with the coded picture, and
the one or more processor circuits are configured such that, as part of generating the sub-sample information box, the one or more processor circuits include, based on the flags having the particular value, in the sub-sample information box, an additional value that indicates a layer identifier of each NAL unit of the sub-sample.

16. The video device of claim 15, wherein the one or more processor circuits are configured to:
based on the flags having the particular value, include, in the sub-sample information box, an additional flag that indicates whether all of the VCL NAL units of the sub-sample are discardable.

17. The video device of claim 15, wherein the one or more processor circuits are configured to:
based on the flags having the particular value, include, in the sub-sample information box, an additional value that indicates a NAL unit type of VCL NAL units of the sub-sample,
wherein all the VCL NAL units of the sub-sample have the same NAL unit type.

18. The video device of claim 15, wherein the one or more processor circuits are configured to:
based on the flags having the particular value, include, in the sub-sample information box, an additional value that indicates a temporal identifier of each NAL unit of the sub-sample.

19. The video device of claim 15, wherein the one or more processor circuits are configured to:
based on the flags having the particular value, include, in the sub-sample information box, an additional flag that indicates whether inter-layer prediction is enabled for all VCL NAL units of the sub-sample.

20. The video device of claim 15, wherein the one or more processor circuits are configured to:
based on the flags having the particular value, include, in the sub-sample information box, an additional flag that indicates whether all NAL units in the sub-sample are VCL NAL units of a sub-layer non-reference picture.

21. The video device of claim 15, wherein the one or more processor circuits are configured to:
encode the multi-layer video data.

22. A video device comprising:
a data storage medium configured to store multi-layer video data; and
one or more processor circuits configured to:
obtain, from a file, a track box that contains metadata for a track in the file, wherein media data for the track comprises a sequence of samples, each of the samples being a video access unit of the multi-layer video data; and
obtain, from the file, a sub-sample information box that contains flags that specify a type of sub-sample information given in the sub-sample information box, wherein based on the flags having a particular value, a sub-sample corresponding to the sub-sample information box contains exactly one coded picture and zero or more non-Video Coding Layer (VCL) Network Abstraction Layer (NAL) units associated with the coded picture,
wherein the one or more processor circuits are configured such that, as part of obtaining the sub-sample information box, the one or more processor circuits obtain, based on the flags having the particular value, from the sub-sample information box, an additional value that indicates a layer identifier of each NAL unit of the sub-sample.

23. The video device of claim 22, wherein the one or more processor circuits are configured to:
based on the flags having the particular value, obtain, from the sub-sample information box, an additional flag that indicates whether all of the VCL NAL units of the sub-sample are discardable.

24. The video device of claim 22, wherein the one or more processor circuits are configured to:
based on the flags having the particular value, obtain, from the sub-sample information box, an additional value that indicates a NAL unit type of VCL NAL units of the sub-sample, and
all the VCL NAL units of the sub-sample have the same NAL unit type.

25. The video device of claim 22, wherein the one or more processor circuits are configured to:
based on the flags having the particular value, obtain, from the sub-sample information box, an additional value that indicates a temporal identifier of each NAL unit of the sub-sample.

26. The video device of claim 22, wherein the one or more processor circuits are configured to:
based on the flags having the particular value, obtain, from the sub-sample information box, an additional flag that indicates whether inter-layer prediction is enabled for all VCL NAL units of the sub-sample.

27. The video device of claim 22, wherein the one or more processor circuits are configured to:
based on the flags having the particular value, obtain, from the sub-sample information box, an additional flag that indicates whether all NAL units in the sub-sample are VCL NAL units of a sub-layer non-reference picture.

28. The video device of claim 22, wherein the one or more processor circuits are configured to:
responsive to a determination based on the information specified in the sub-sample information box that the coded picture is required in order to decode an operation point, include NAL units of the sub-sample in a sub-bitstream; and
output the sub-bitstream.

29. A video device comprising:
means for generating a file that comprises a track box that contains metadata for a track in the file, wherein:
media data for the track comprises a sequence of samples, each of the samples being a video access unit of multi-layer video data;
generating the file comprises generating, in the file, a sub-sample information box that contains flags that specify a type of sub-sample information given in the sub-sample information box,
based on the flags having a particular value, a sub-sample corresponding to the sub-sample information box contains exactly one coded picture and zero or more non-Video Coding Layer (VCL) Network Abstraction Layer (NAL) units associated with the coded picture, and
the means for generating the sub-sample information box comprises means for including, based on the flags having the particular value, in the sub-sample information box, an additional value that indicates a layer identifier of each NAL unit of the sub-sample.

30. The video device of claim 29, comprising means for including, based on the flags having the particular value, in the sub-sample information box, one or more of:

an additional flag that indicates whether all of the VCL NAL units of the sub-sample are discardable,
an additional value that indicates a NAL unit type of VCL NAL units of the sub-sample, wherein all the VCL NAL units of the sub-sample have the same NAL unit type,
an additional value that indicates a temporal identifier of each NAL unit of the sub-sample,
an additional flag that indicates whether inter-layer prediction is enabled for all VCL NAL units of the sub-sample, or
an additional flag that indicates whether all NAL units in the sub-sample are VCL NAL units of a sub-layer non-reference picture.

31. A video device comprising:
means for obtaining, from a file, a track box that contains metadata for a track in the file, wherein media data for the track comprises a sequence of samples, each of the samples being a video access unit of multi-layer video data; and
means for obtaining, from the file, a sub-sample information box that contains flags that specify a type of sub-sample information given in the sub-sample information box, wherein based on the flags having a particular value, a sub-sample corresponding to the sub-sample information box contains exactly one coded picture and zero or more non-Video Coding Layer (VCL) Network Abstraction Layer (NAL) units associated with the coded picture,
wherein the means for obtaining the sub-sample information box comprises means for obtaining, based on the flags having the particular value, from the sub-sample information box, an additional value that indicates a layer identifier of each NAL unit of the sub-sample.

32. The video device of claim 31, comprising means for obtaining, based on the flags having the particular value, from the sub-sample information box, one or more of:
an additional flag that indicates whether all of the VCL NAL units of the sub-sample are discardable,
an additional value that indicates a NAL unit type of VCL NAL units of the sub-sample, wherein all the VCL NAL units of the sub-sample have the same NAL unit type,
an additional value that indicates a temporal identifier of each NAL unit of the sub-sample,
an additional flag that indicates whether inter-layer prediction is enabled for all VCL NAL units of the sub-sample, or
an additional flag that indicates whether all NAL units in the sub-sample are VCL NAL units of a sub-layer non-reference picture.

33. A non-transitory computer readable data storage medium having instructions stored thereon that when executed cause one or more processor circuits to:
generate a file that comprises a track box that contains metadata for a track in the file, wherein:
media data for the track comprises a sequence of samples, each of the samples being a video access unit of multi-layer video data;
to generate the file, the instructions cause the one or more processor circuits to generate, in the file, a sub-sample information box that contains flags that specify a type of sub-sample information given in the sub-sample information box, based on the flags having a particular value, a sub-sample corresponding to the sub-sample information box contains exactly one coded picture and zero or more non-Video Coding Layer (VCL) Network Abstraction Layer (NAL) units associated with the coded picture, and as part of causing the one or more processor circuits to generate the sub-sample information box, the instructions cause the one or more processor circuits to include, based on the flags having the particular value, in the sub-sample information box, an additional value that indicates a layer identifier of each NAL unit of the sub-sample.

34. The non-transitory computer readable data storage medium of claim 33, wherein the instructions cause the one or more processor circuits to include, based on the flags having the particular value, in the sub-sample information box, one or more of:

an additional flag that indicates whether all of the VCL NAL units of the sub-sample are discardable, an additional value that indicates a NAL unit type of VCL NAL units of the sub-sample, wherein all the VCL NAL units of the sub-sample have the same NAL unit type, an additional value that indicates a temporal identifier of each NAL unit of the sub-sample, an additional flag that indicates whether inter-layer prediction is enabled for all VCL NAL units of the sub-sample, or an additional flag that indicates whether all NAL units in the sub-sample are VCL NAL units of a sub-layer non-reference picture.

35. A non-transitory computer readable data storage medium having instructions stored thereon that when executed cause one or more processor circuits to:

obtain, from a file, a track box that contains metadata for a track in the file, wherein media data for the track comprises a sequence of samples, each of the samples being a video access unit of multi-layer video data; and obtain, from the file, a sub-sample information box that contains flags that specify a type of sub-sample information given in the sub-sample information box, wherein based on the flags having a particular value, a sub-sample corresponding to the sub-sample information box contains exactly one coded picture and zero or more non-Video Coding Layer (VCL) Network Abstraction Layer (NAL) units associated with the coded picture, wherein as part of causing the one or more processor circuits to obtain the sub-sample information box, the instructions cause the one or more processor circuits to obtain, based on the flags having the particular value, from the sub-sample information box, an additional value that indicates a layer identifier of each NAL unit of the sub-sample.

36. The non-transitory computer readable data storage medium of claim 35, wherein, based on the flags having the particular value, the instructions cause the one or more processor circuits to obtain, from the sub-sample information box, one or more of:

an additional flag that indicates whether all of the VCL NAL units of the sub-sample are discardable, an additional value that indicates a NAL unit type of VCL NAL units of the sub-sample, wherein all the VCL NAL units of the sub-sample have the same NAL unit type, an additional value that indicates a temporal identifier of each NAL unit of the sub-sample, an additional flag that indicates whether inter-layer prediction is enabled for all VCL NAL units of the sub-sample, or an additional flag that indicates whether all NAL units in the sub-sample are VCL NAL units of a sub-layer non-reference picture.

* * * * *